Aug. 17, 1965  A. KATZ  3,200,439
PLASTIC DIE-MOLDING APPARATUS
Filed Dec. 12, 1962  33 Sheets-Sheet 1
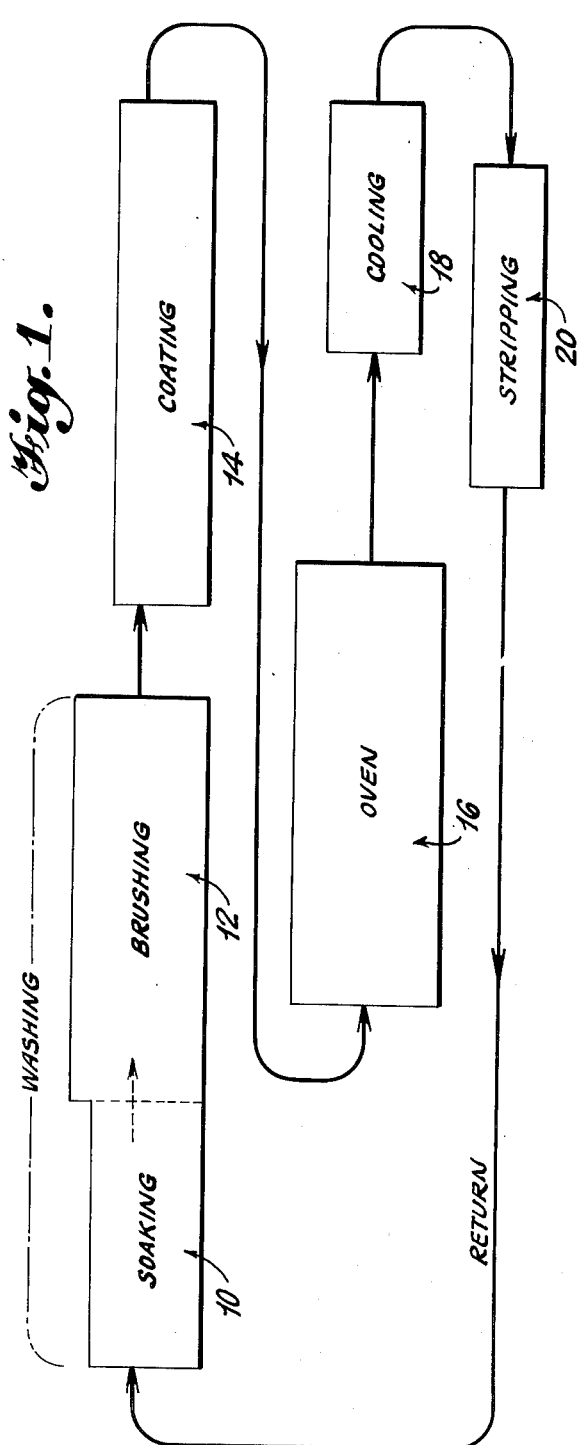
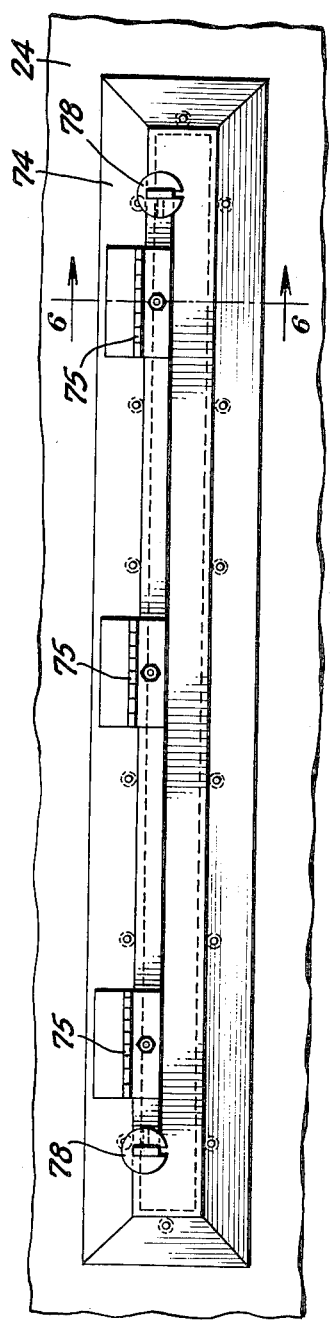
INVENTOR
*Alexander Katz*
BY *Stevens, Davis, Miller & Mosher*
ATTORNEYS

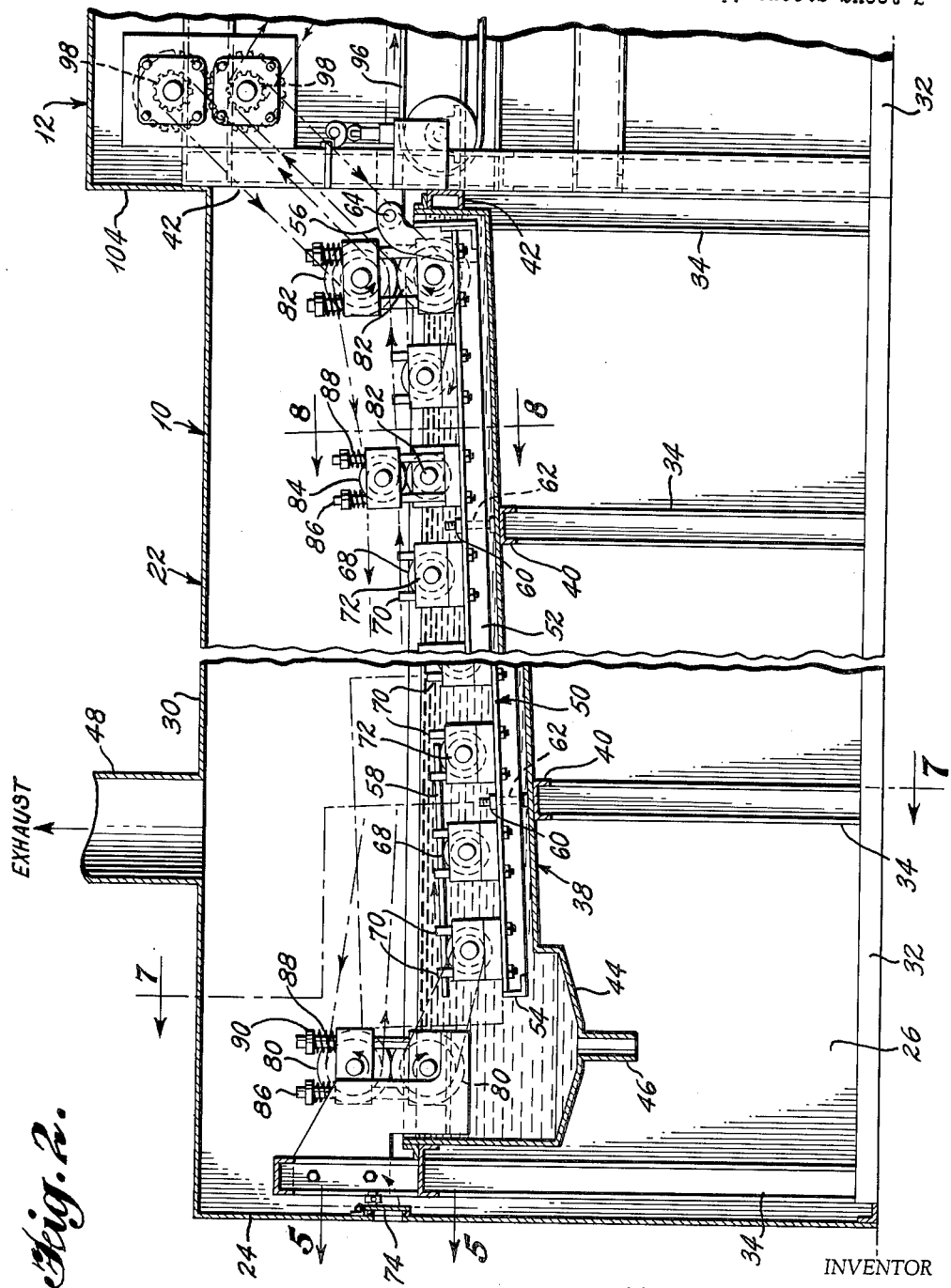

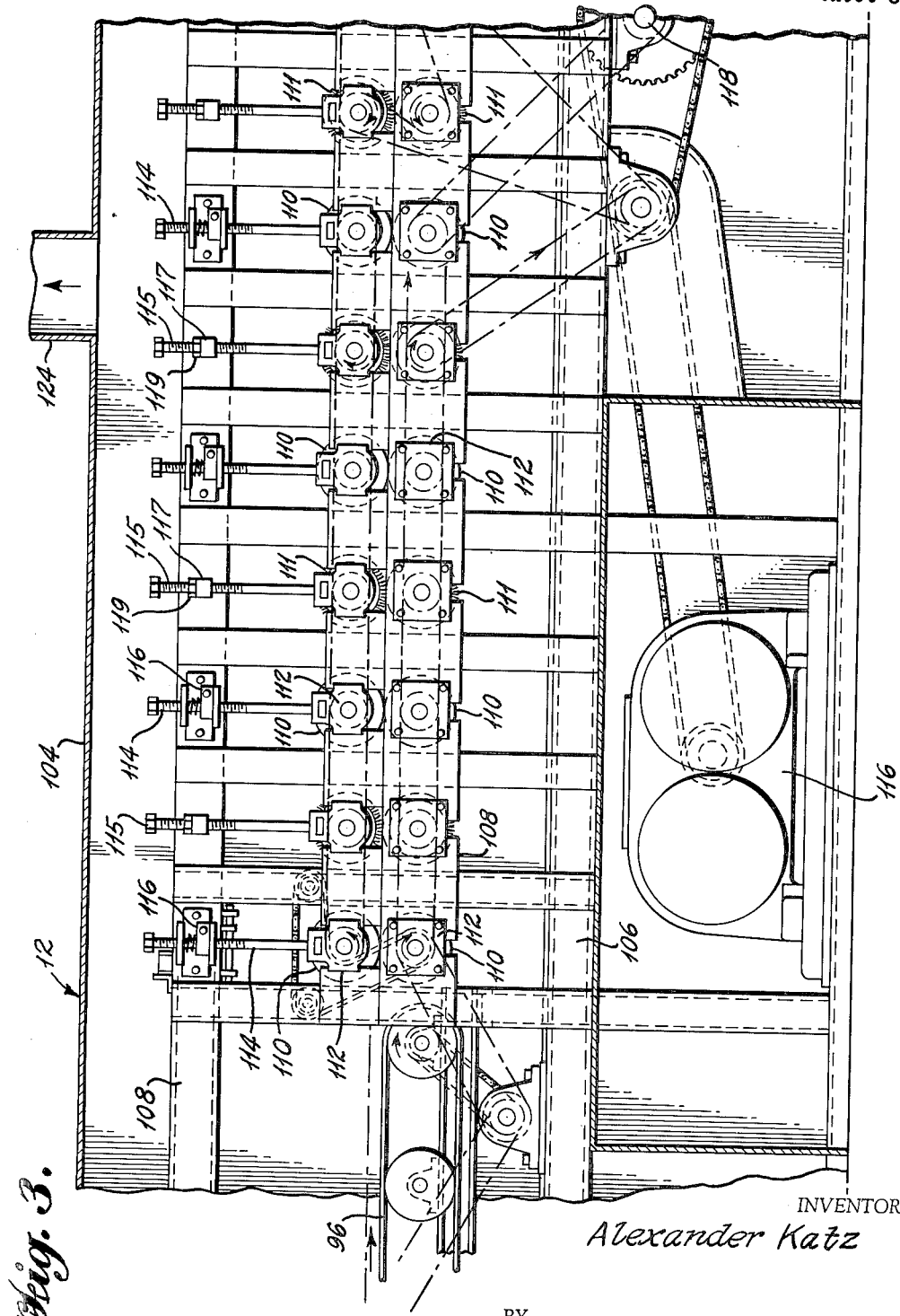

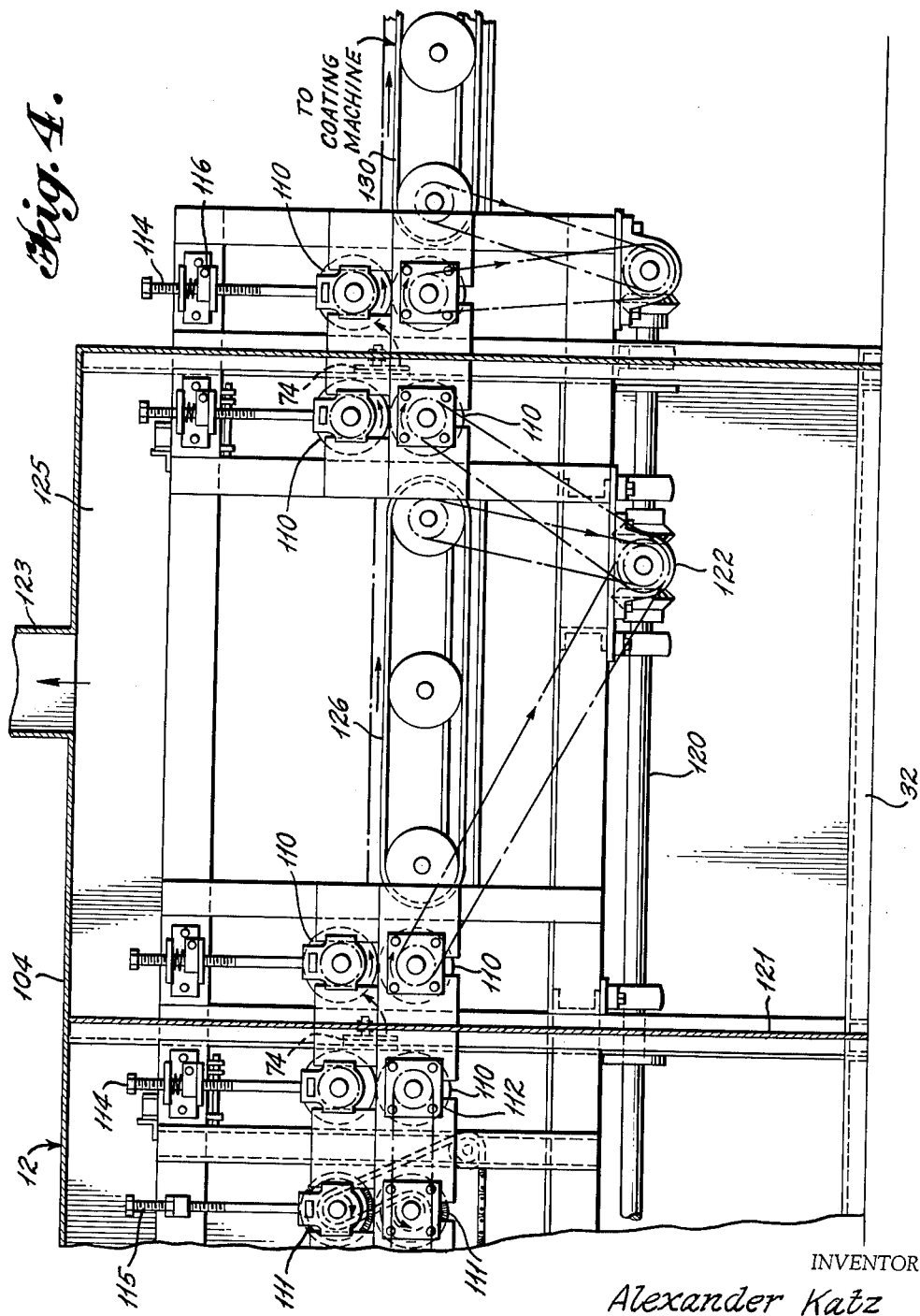

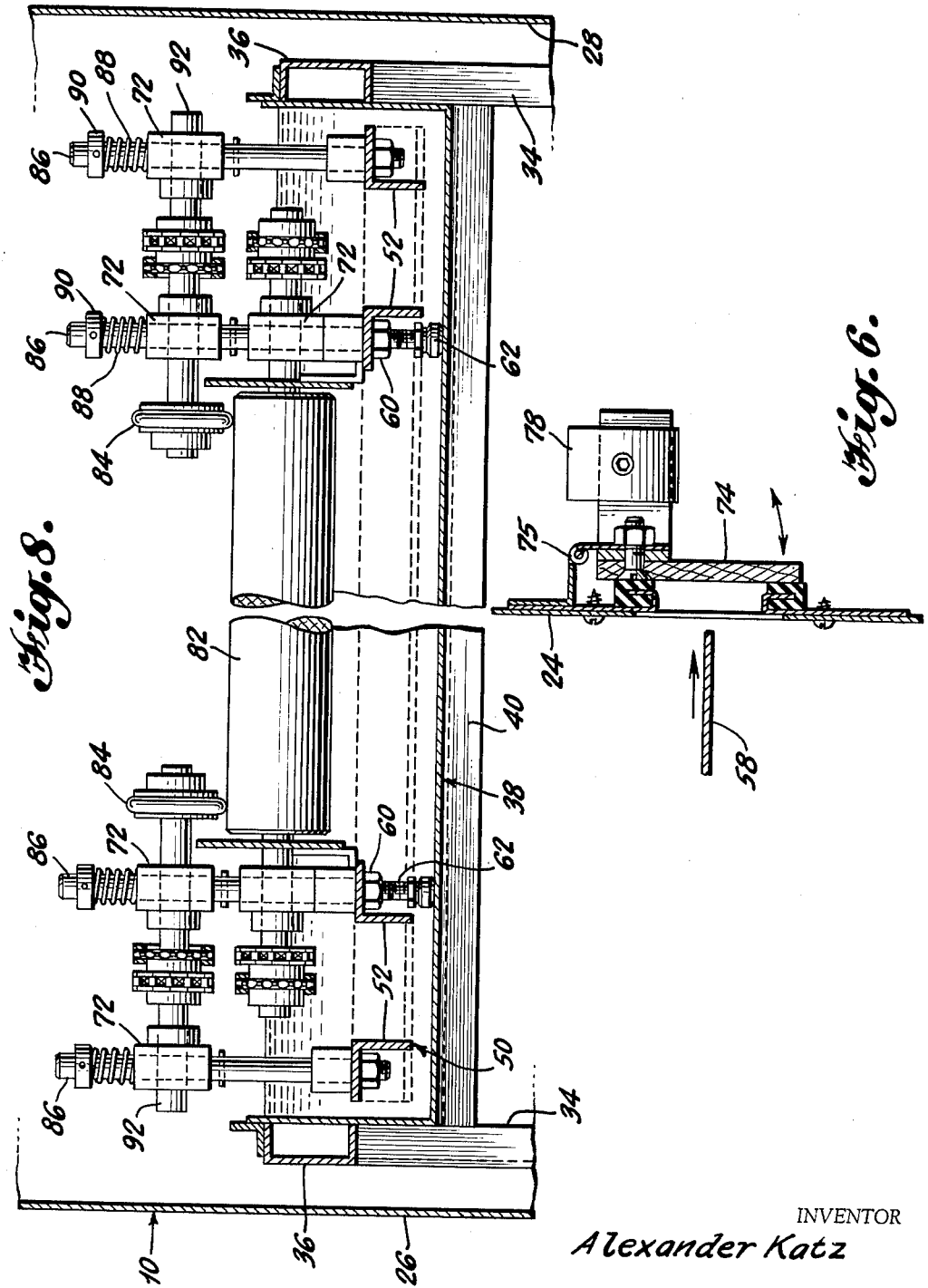

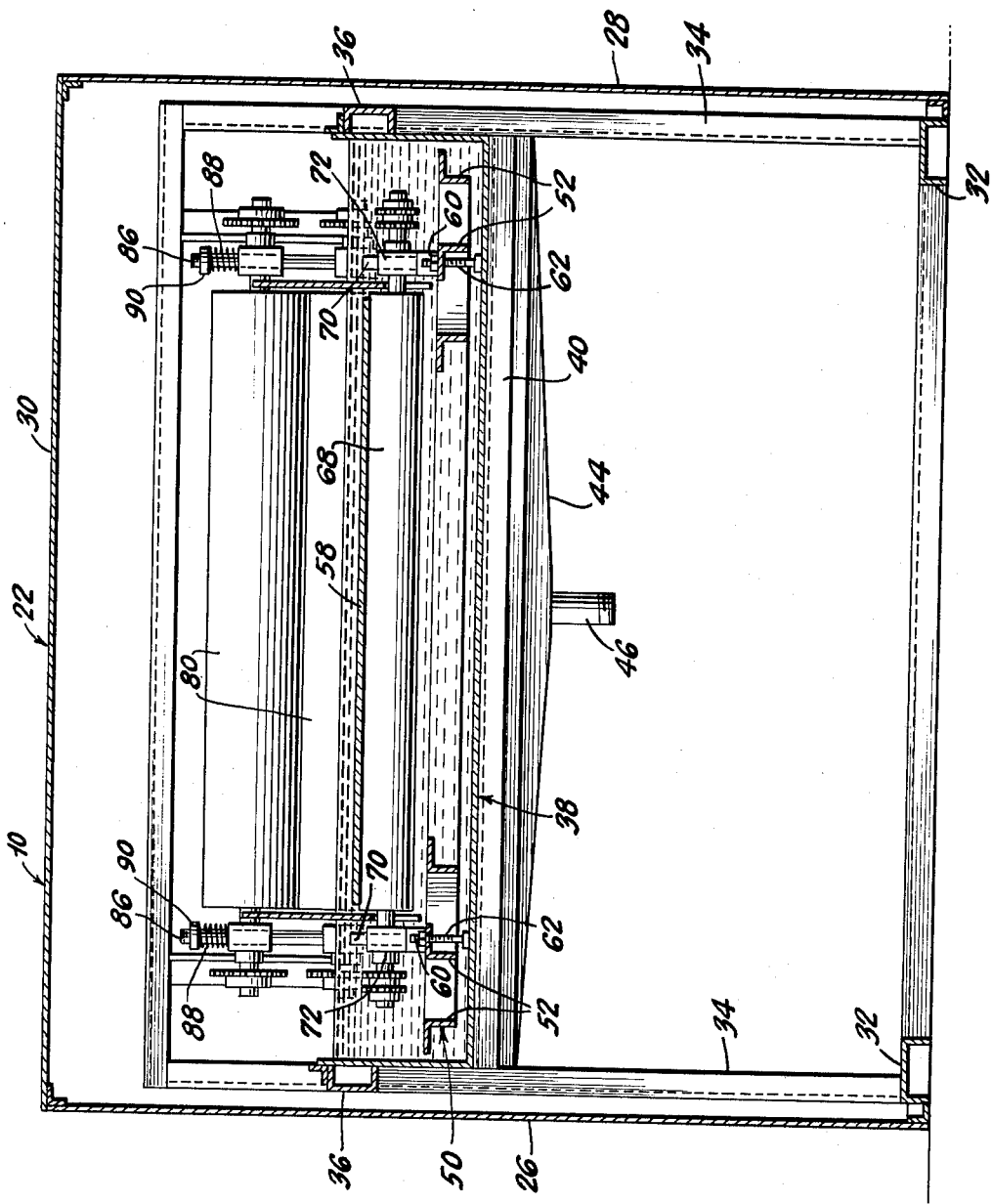

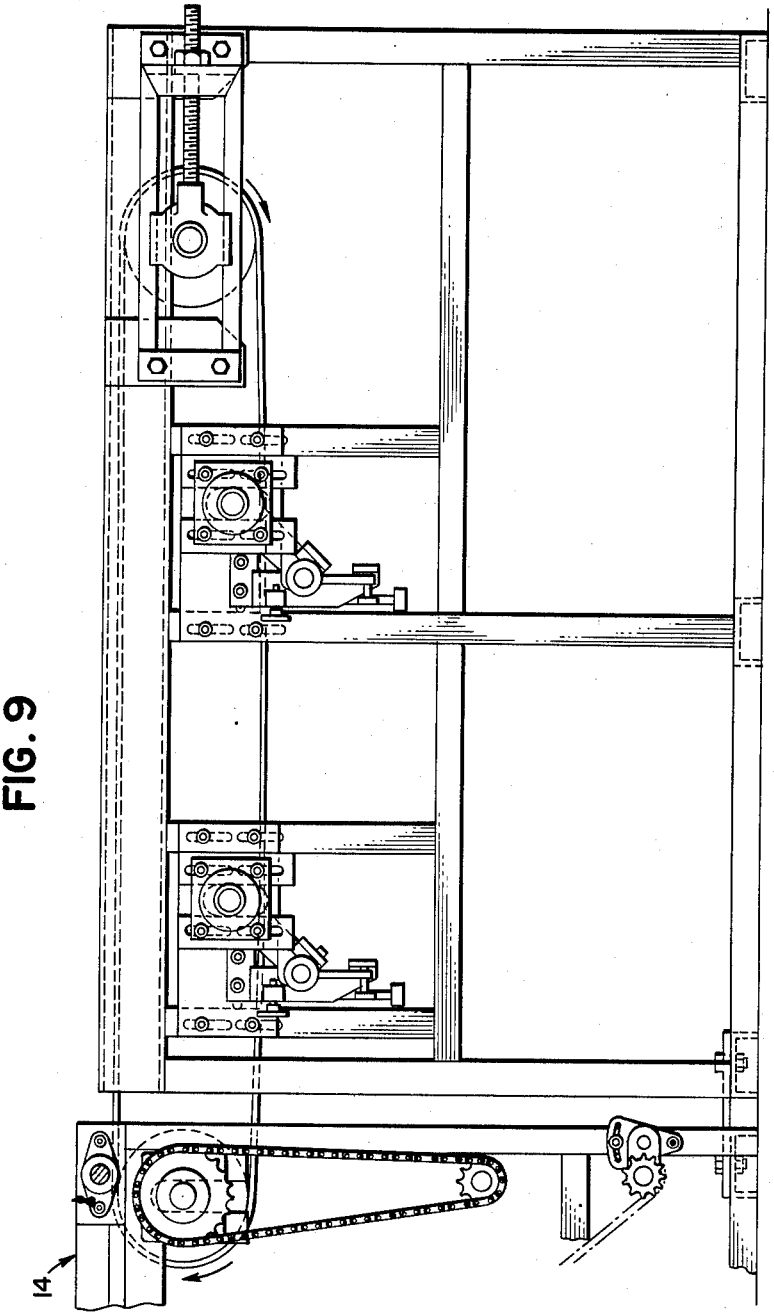

Aug. 17, 1965 A. KATZ 3,200,439
PLASTIC DIE-MOLDING APPARATUS
Filed Dec. 12, 1962 33 Sheets-Sheet 8
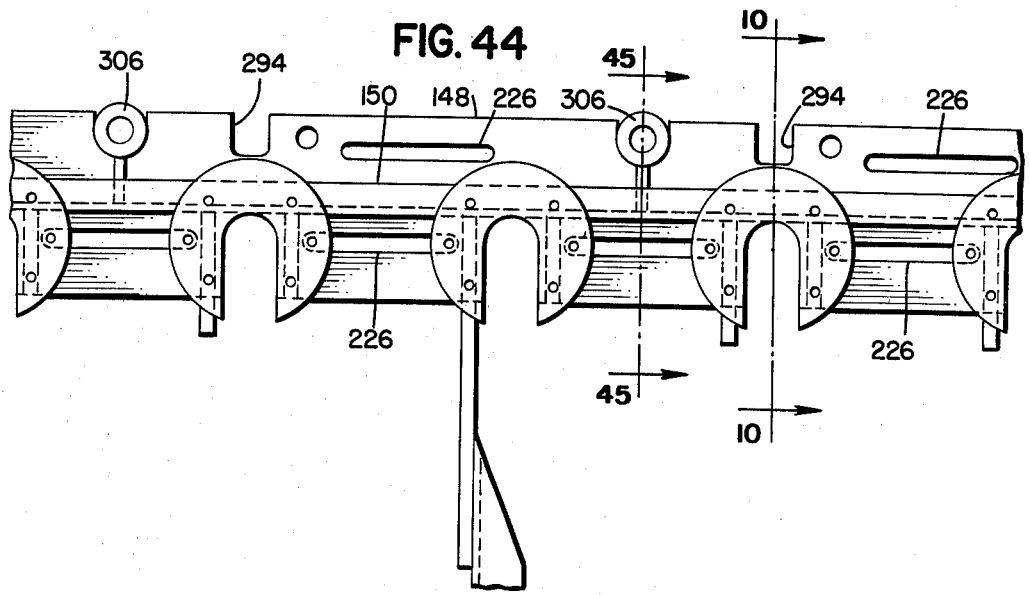
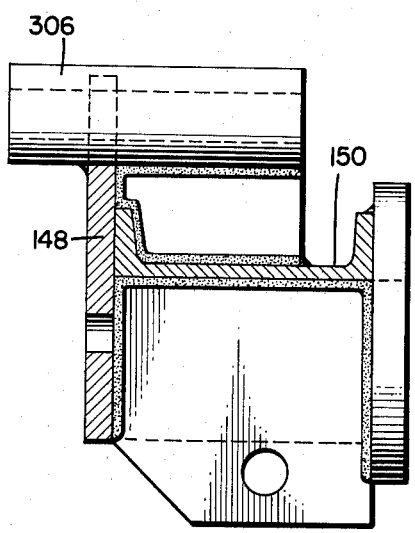
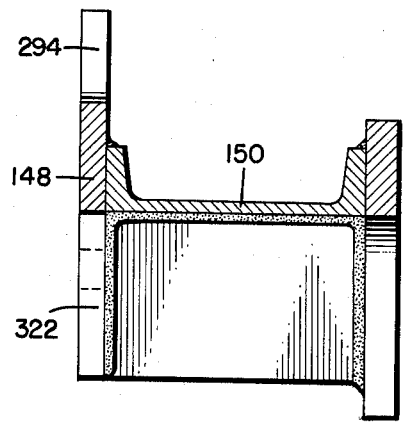
INVENTOR
Alexander Katz
BY *Stevens, Davis, Miller & Mosher*
ATTORNEYS

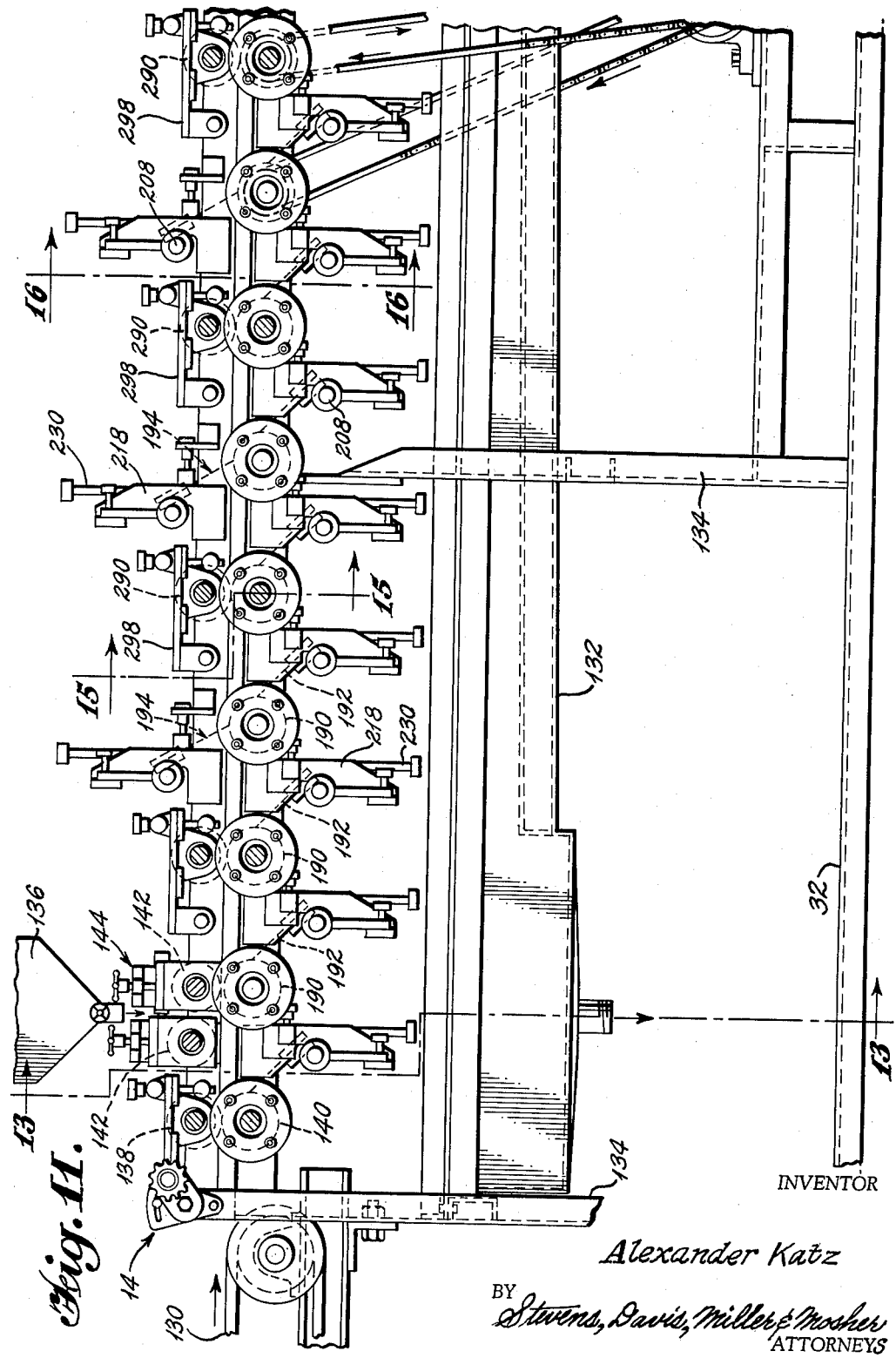

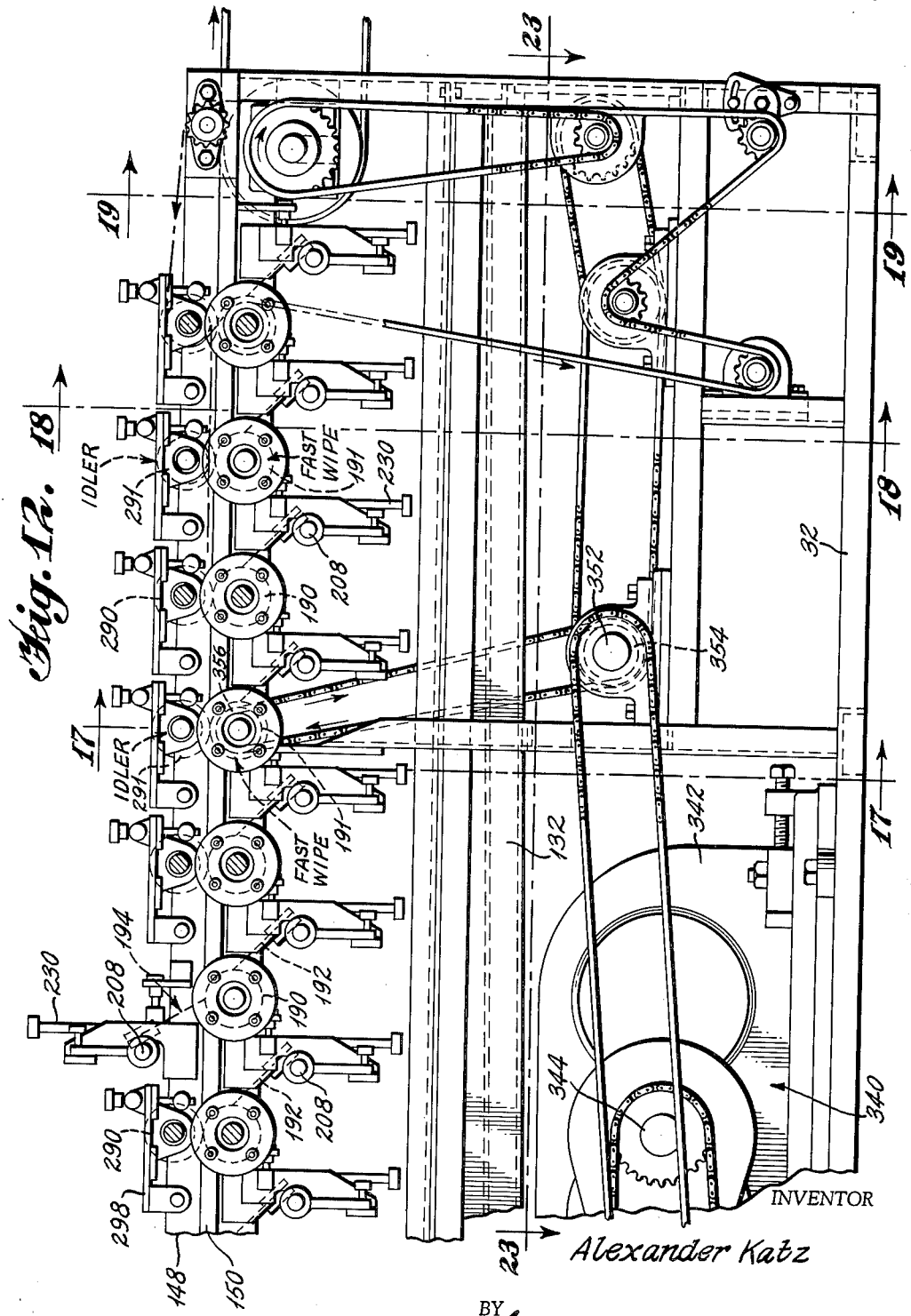

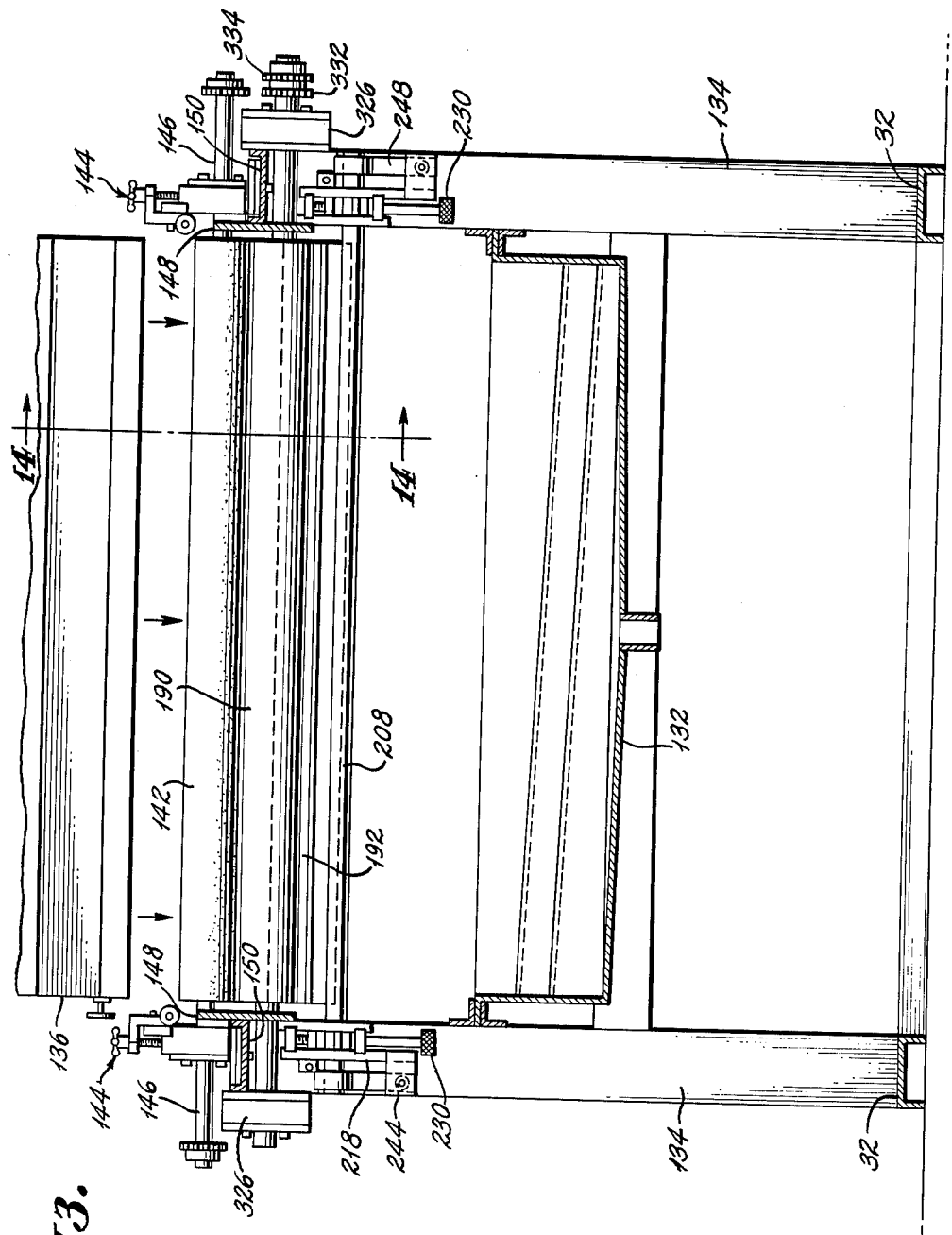

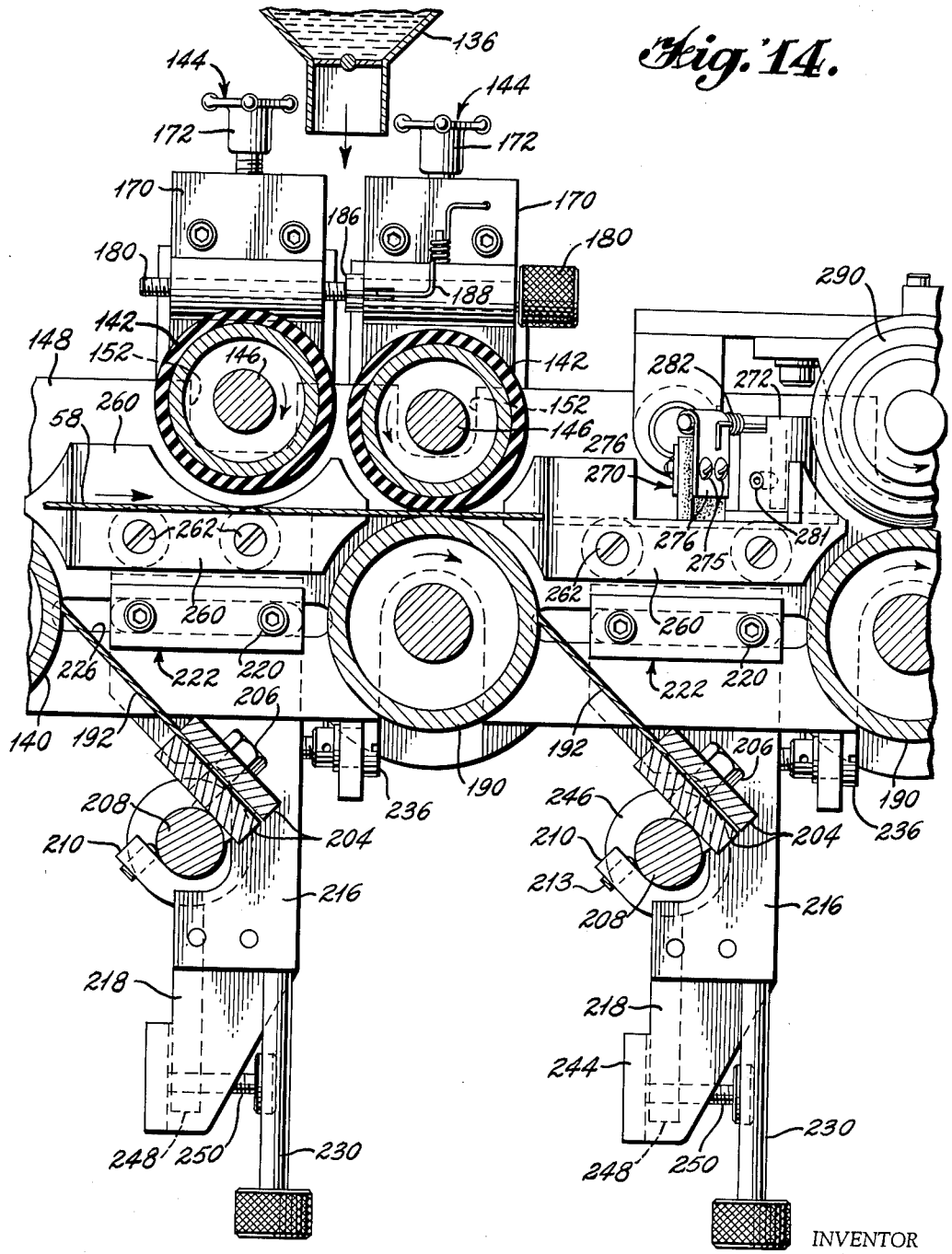

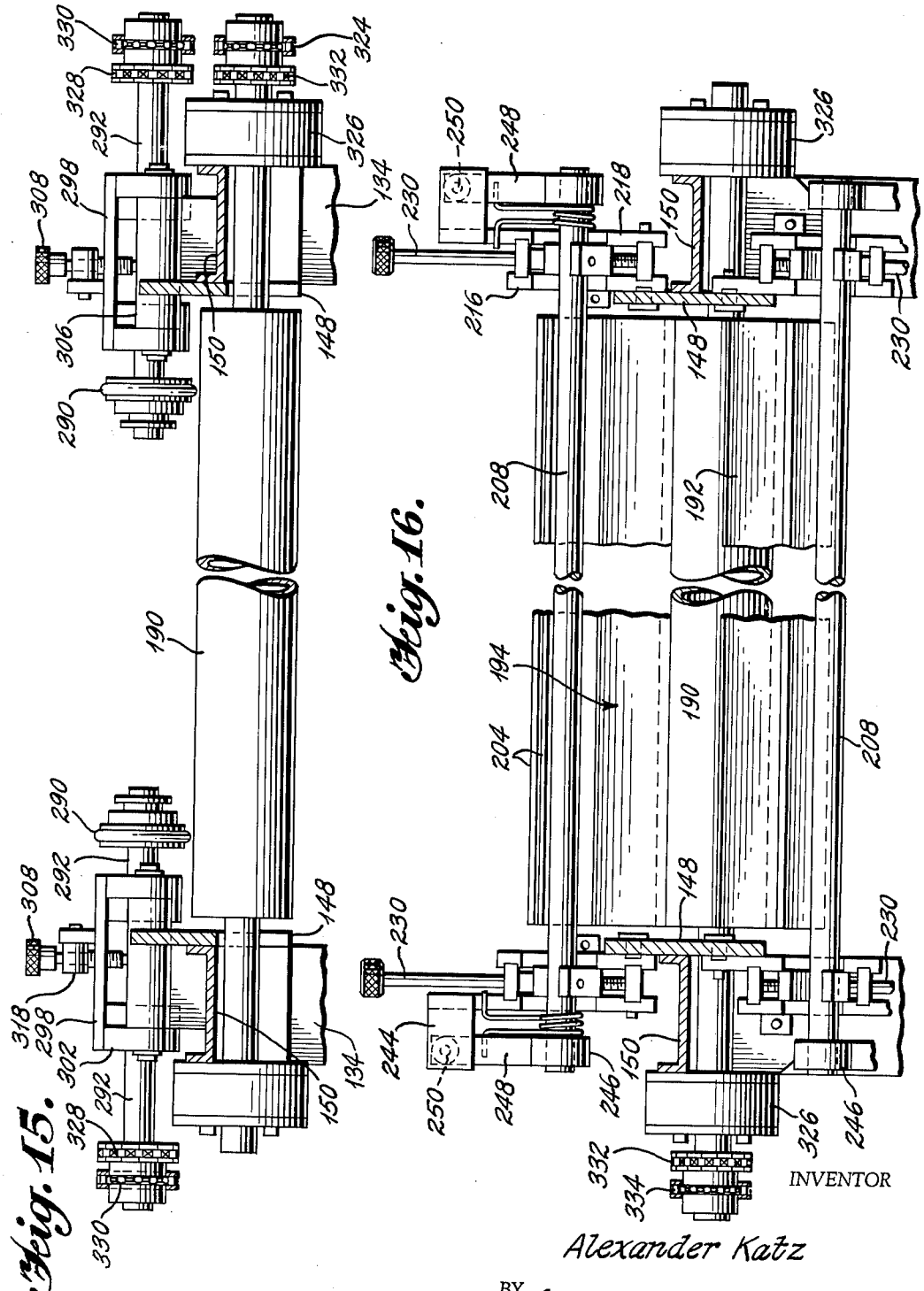

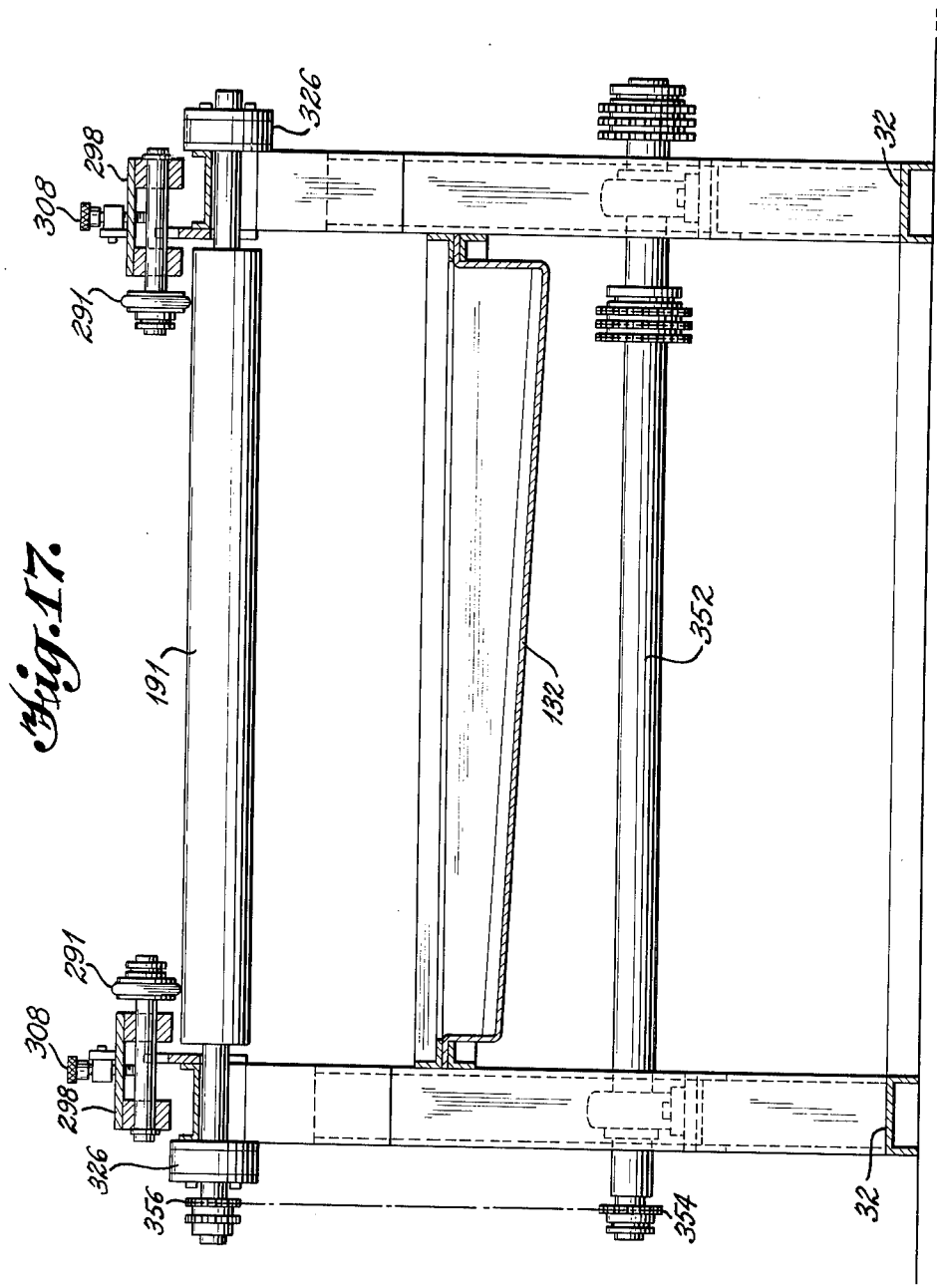

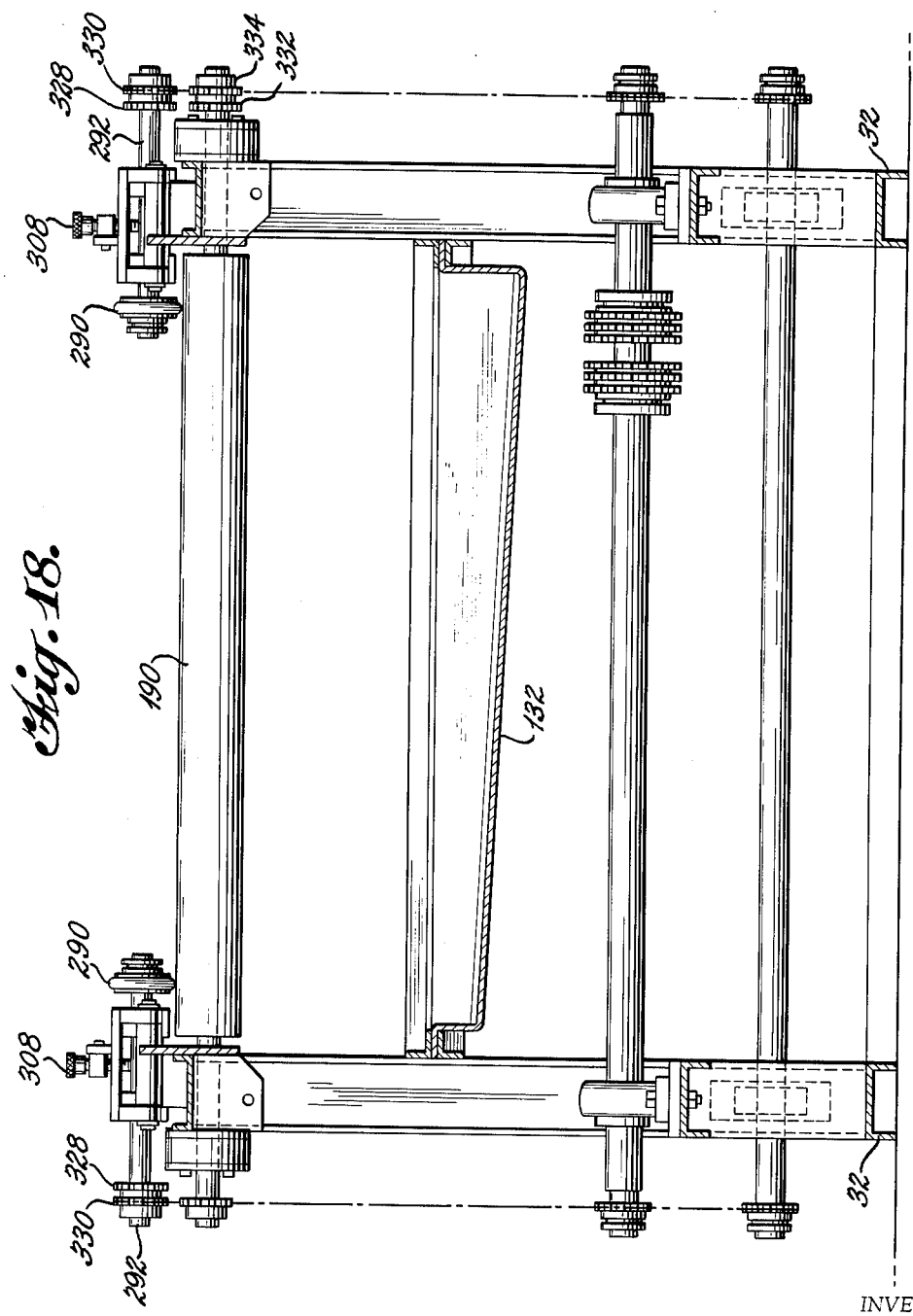

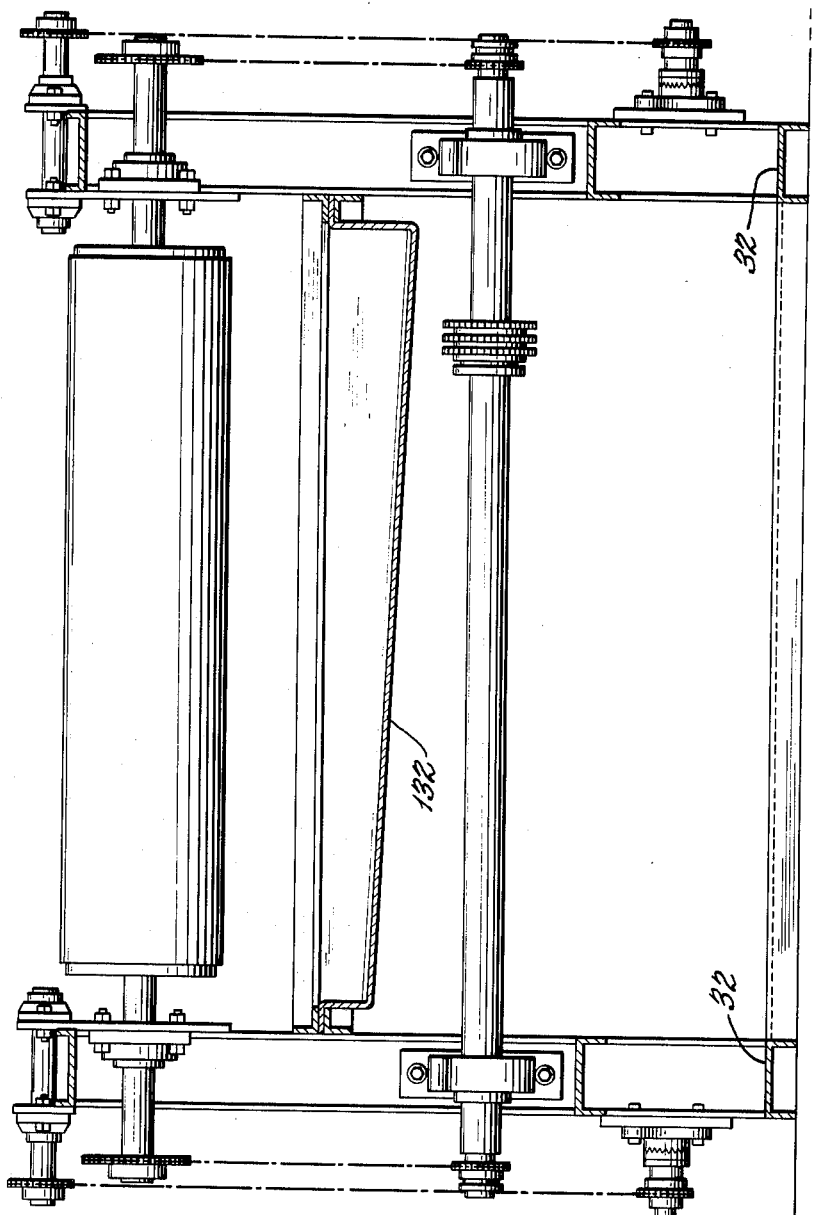

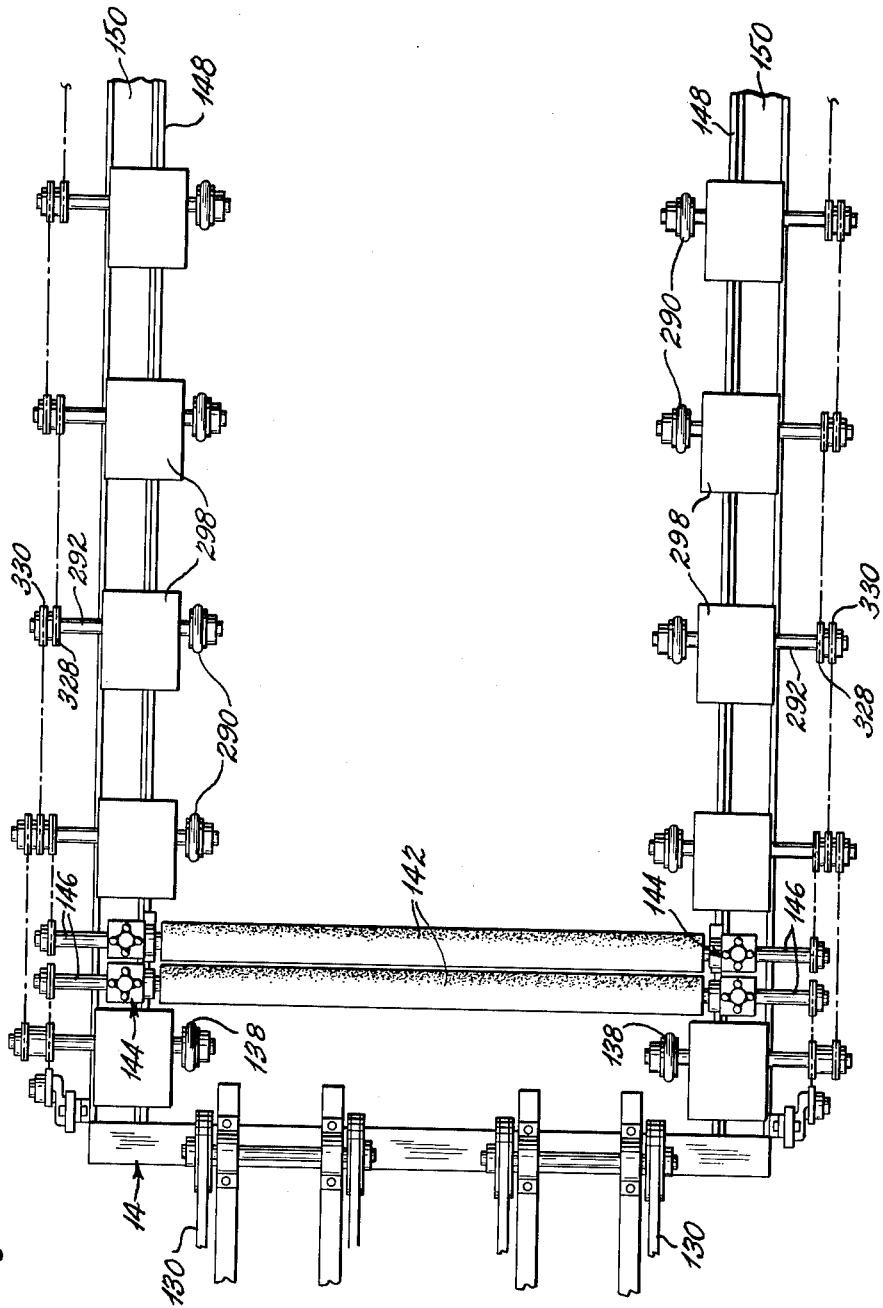

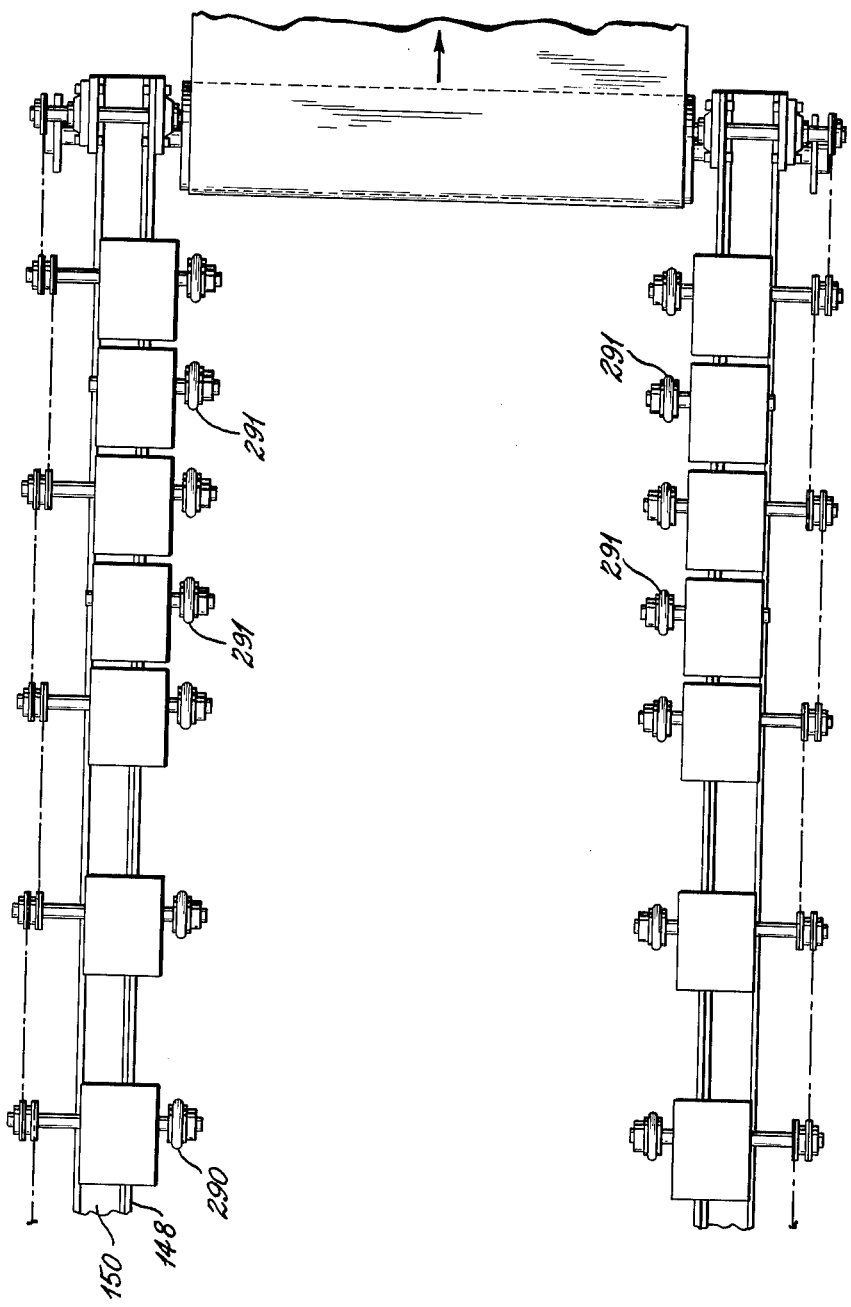

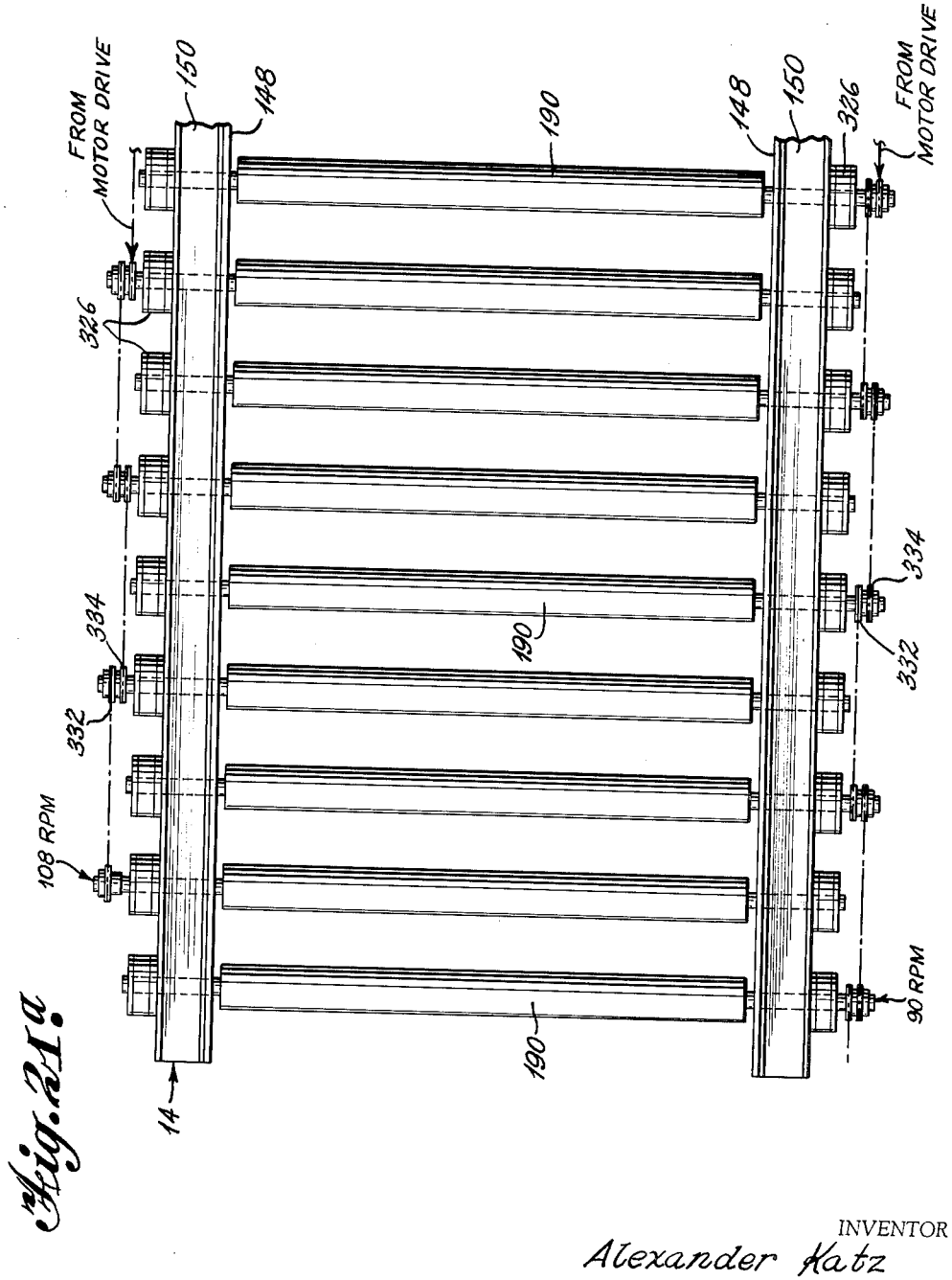

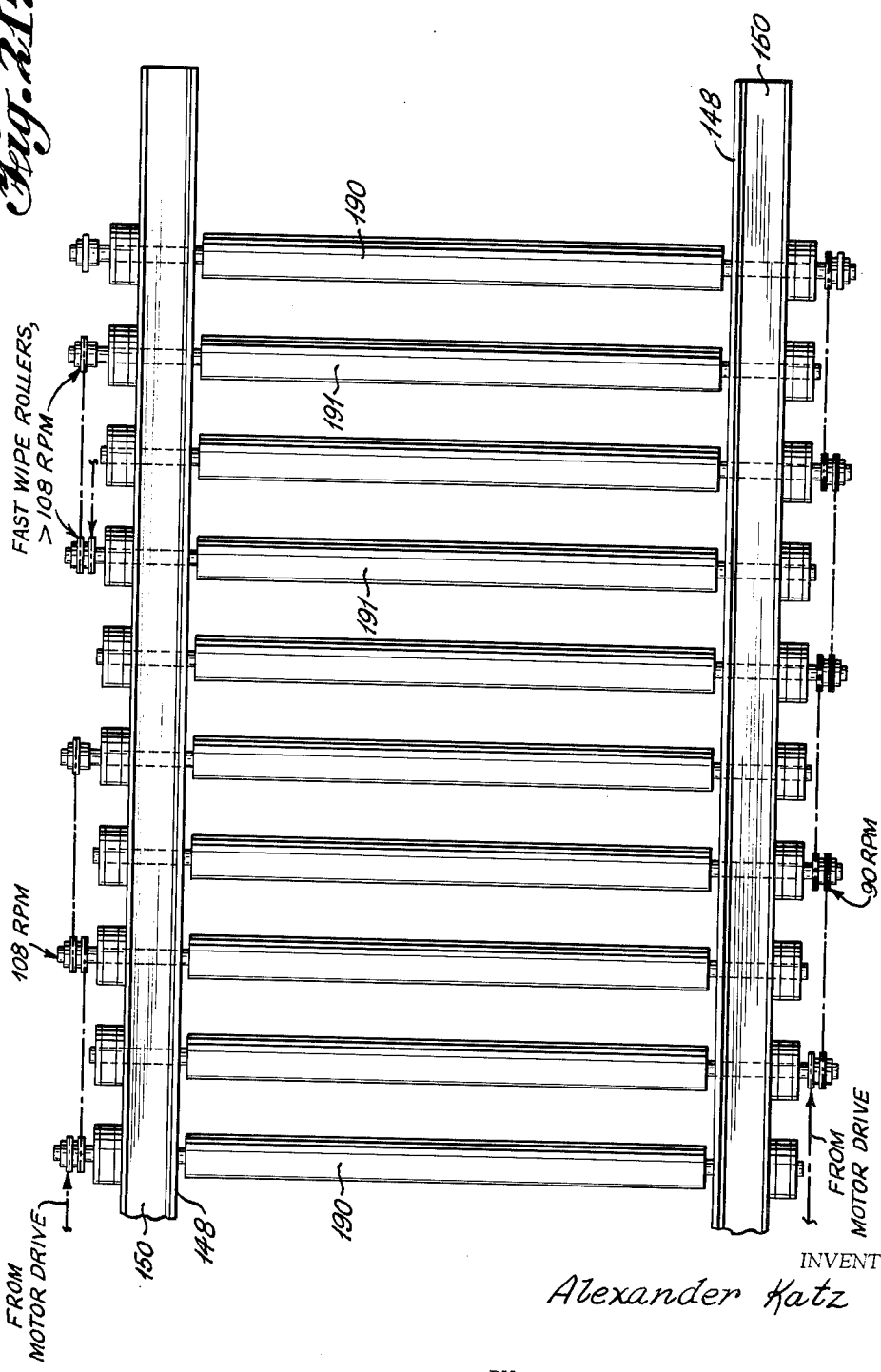

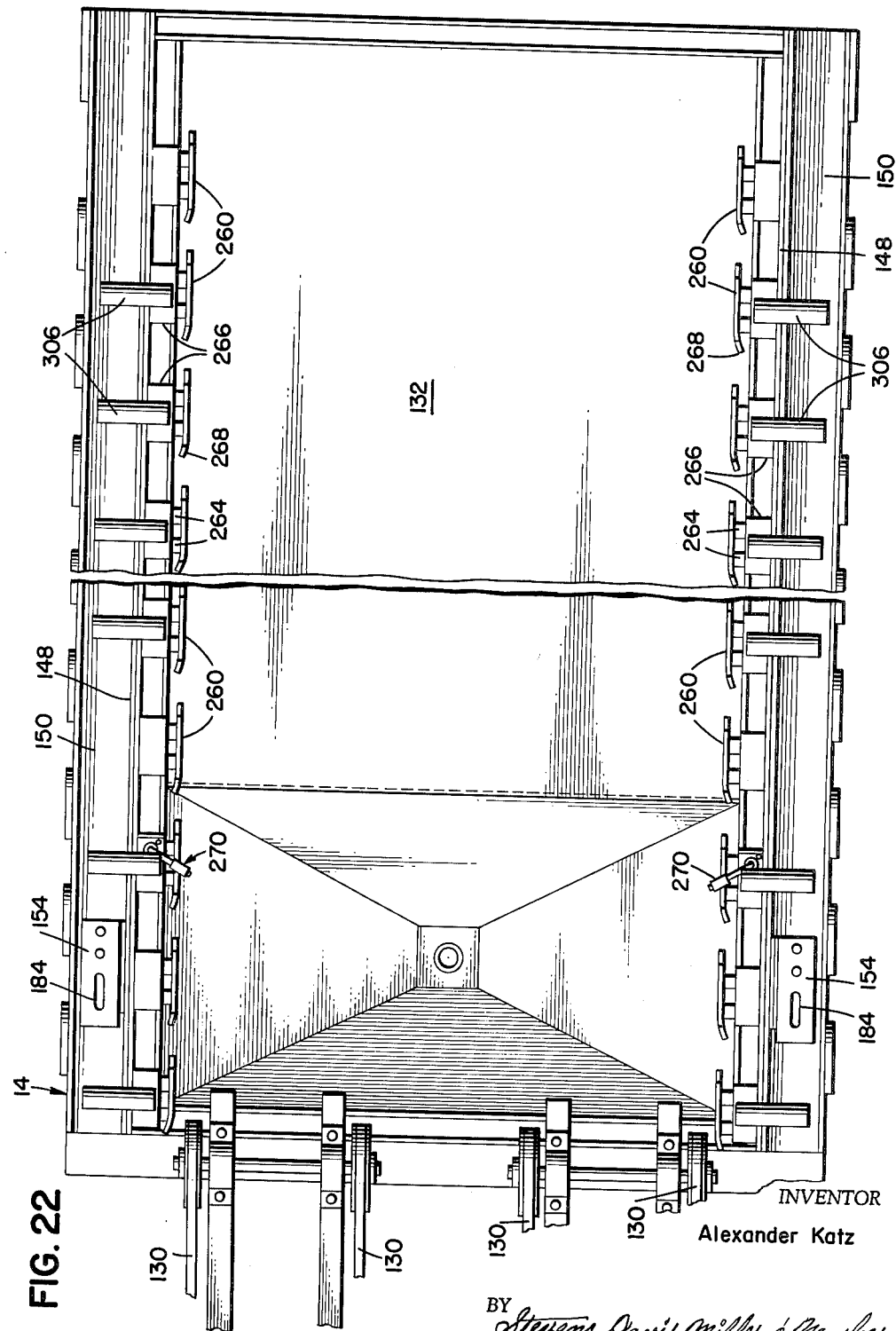

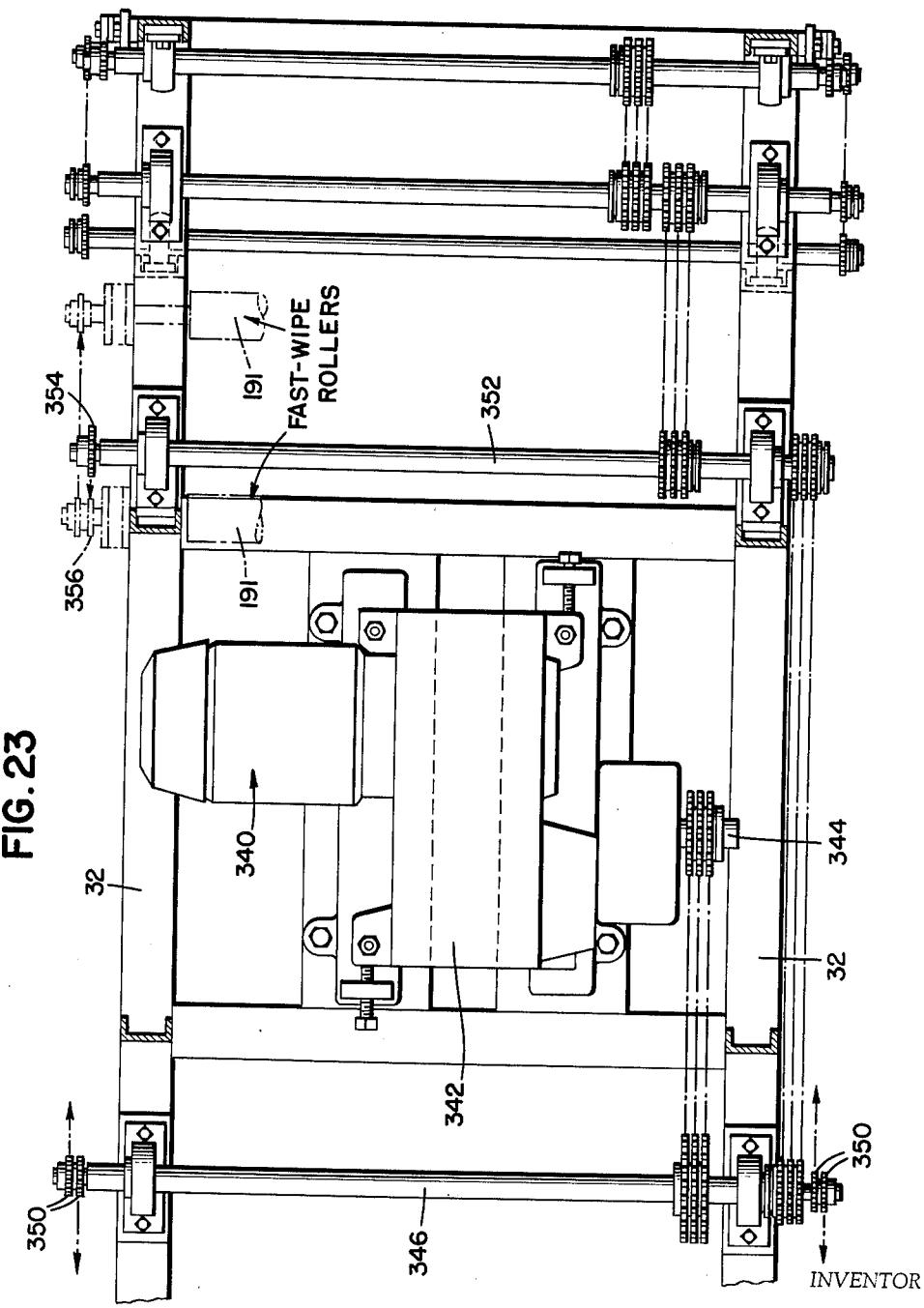

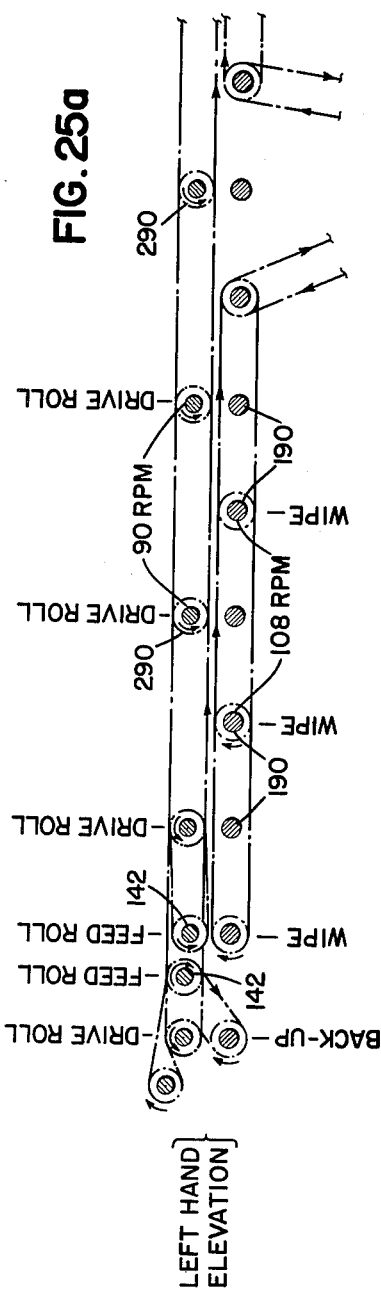
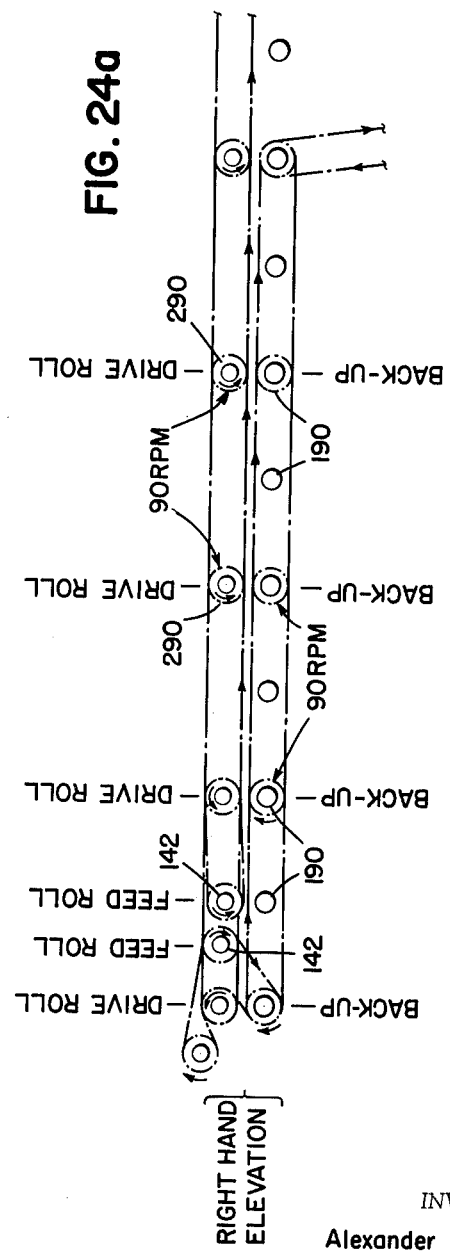

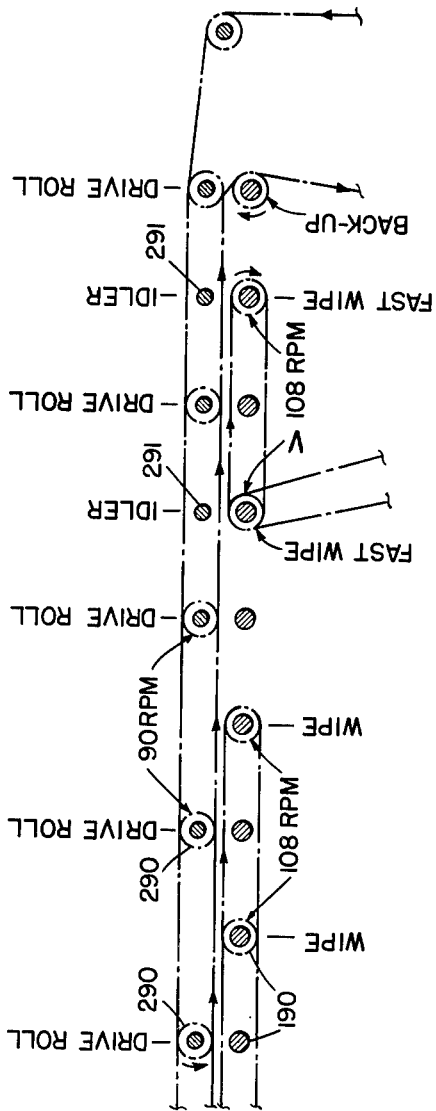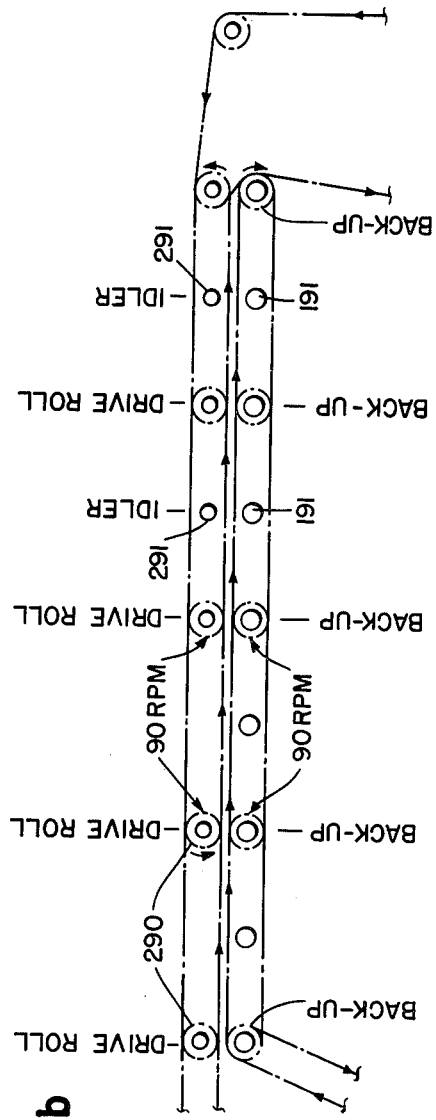

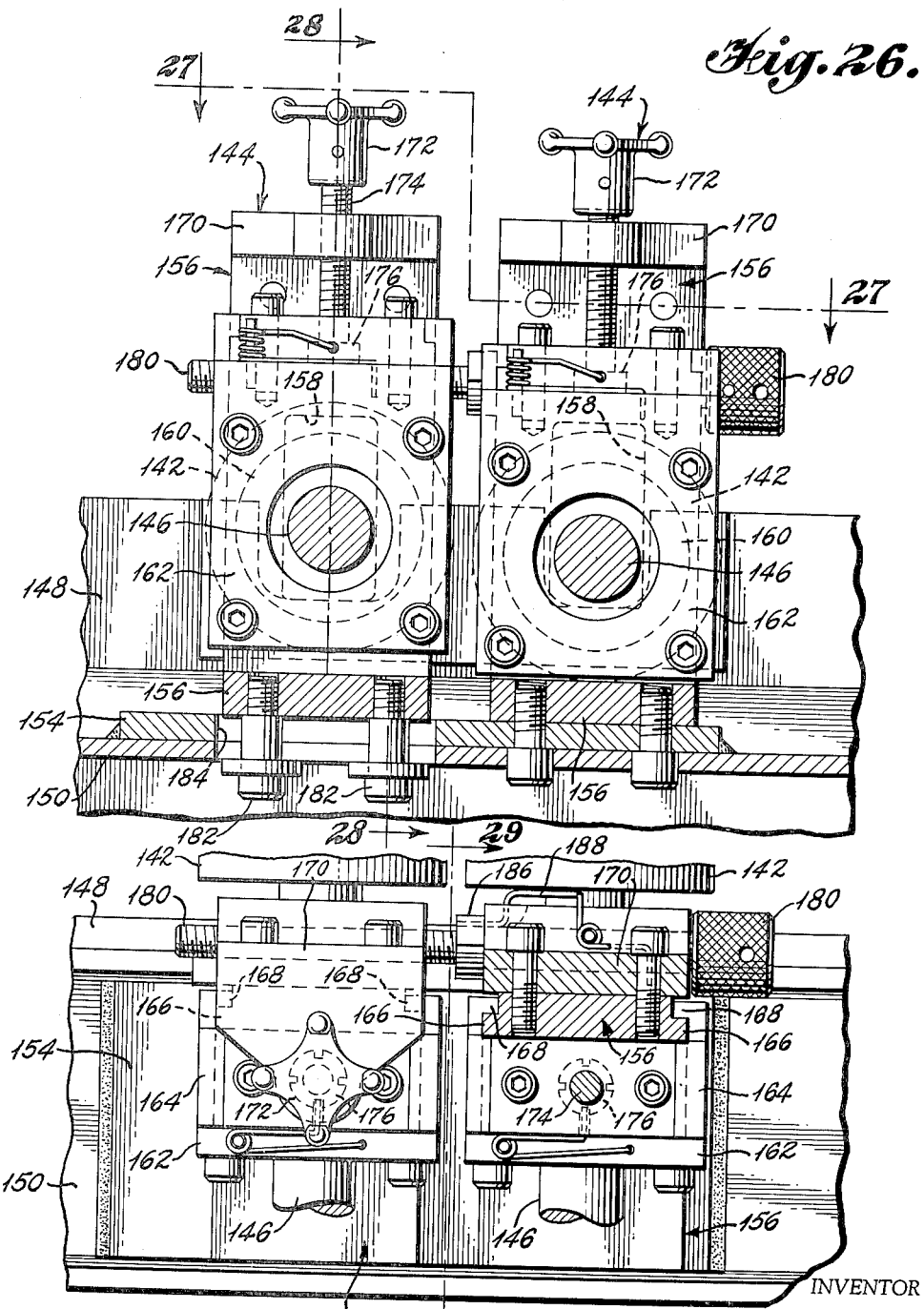

Aug. 17, 1965

A. KATZ 3,200,439

PLASTIC DIE-MOLDING APPARATUS

Filed Dec. 12, 1962

INVENTOR
Alexander Katz
BY
Stevens, Davis, Miller & Mosher
ATTORNEYS

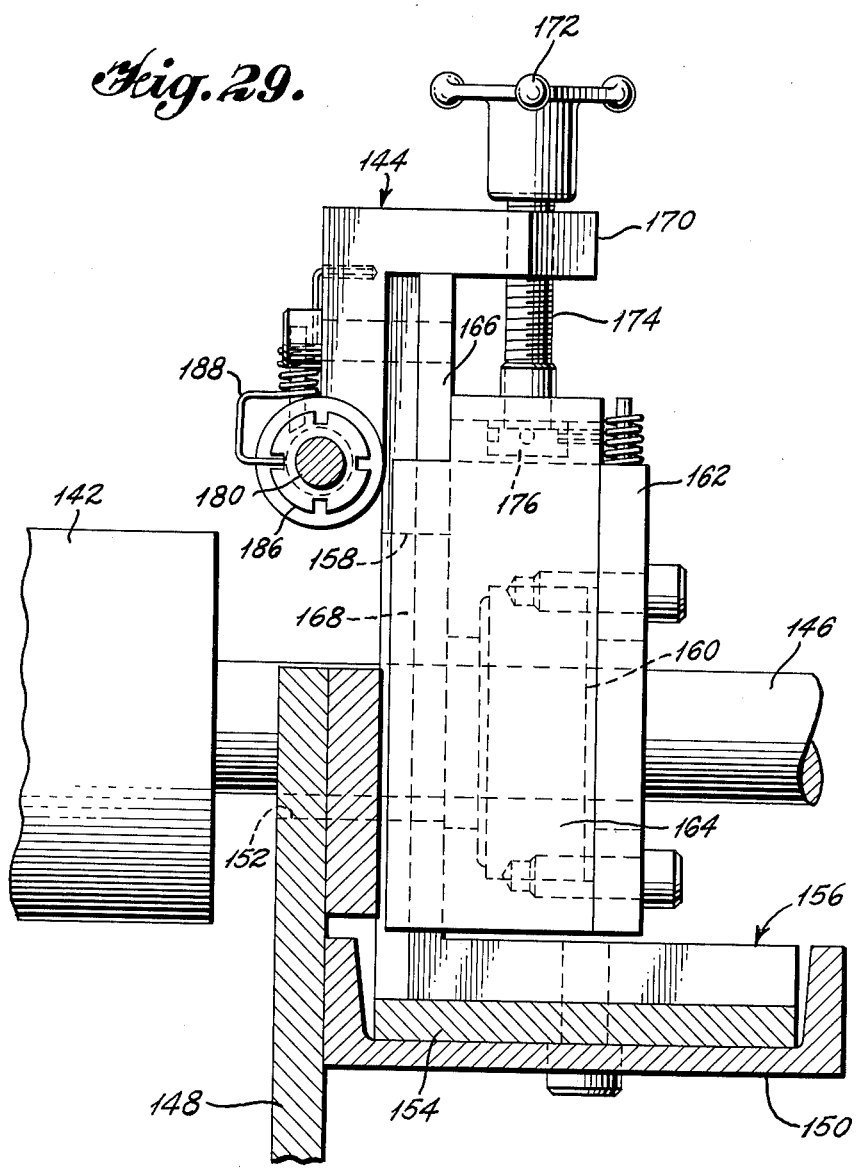

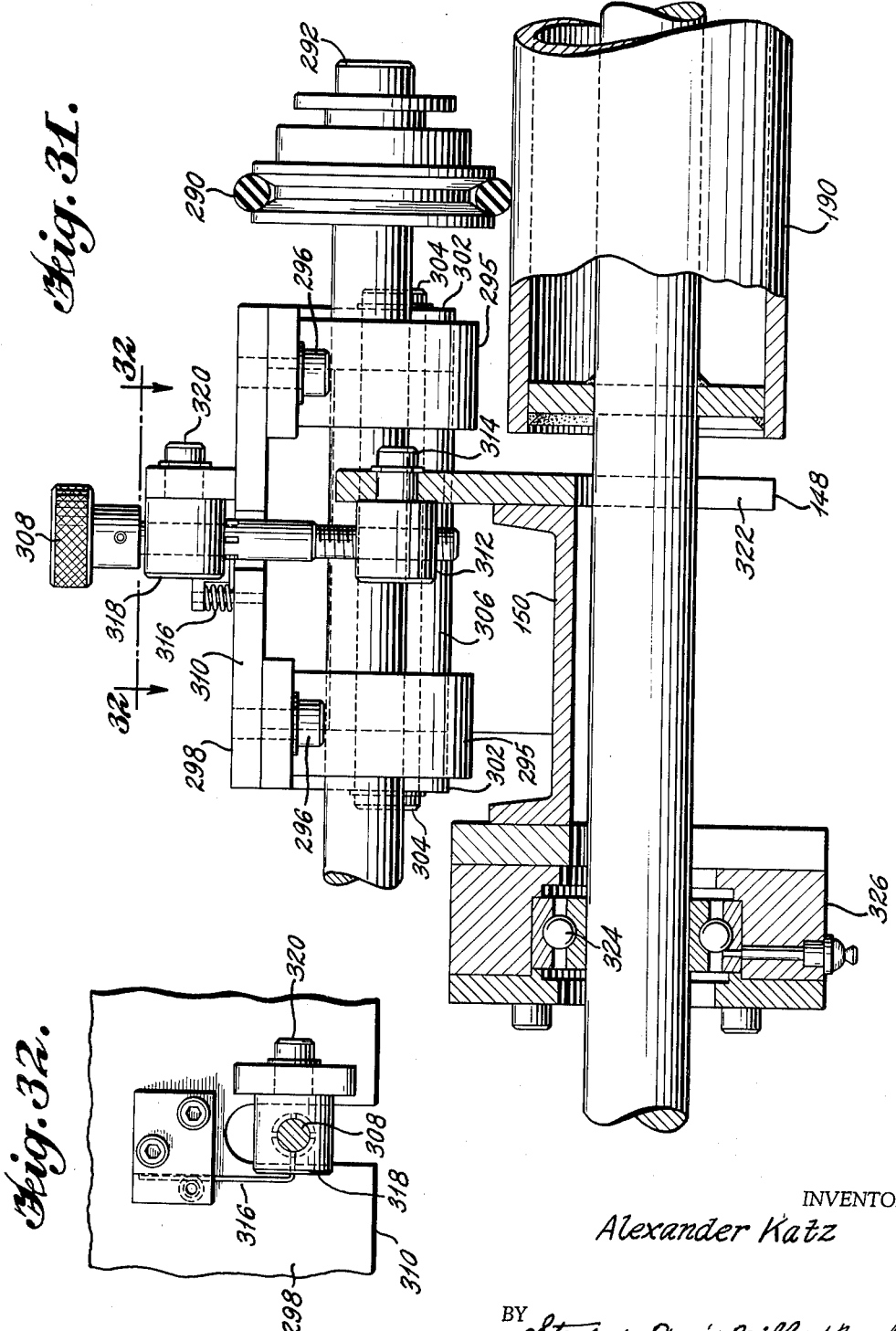

Aug. 17, 1965 A. KATZ 3,200,439
PLASTIC DIE-MOLDING APPARATUS
Filed Dec. 12, 1962 33 Sheets-Sheet 29
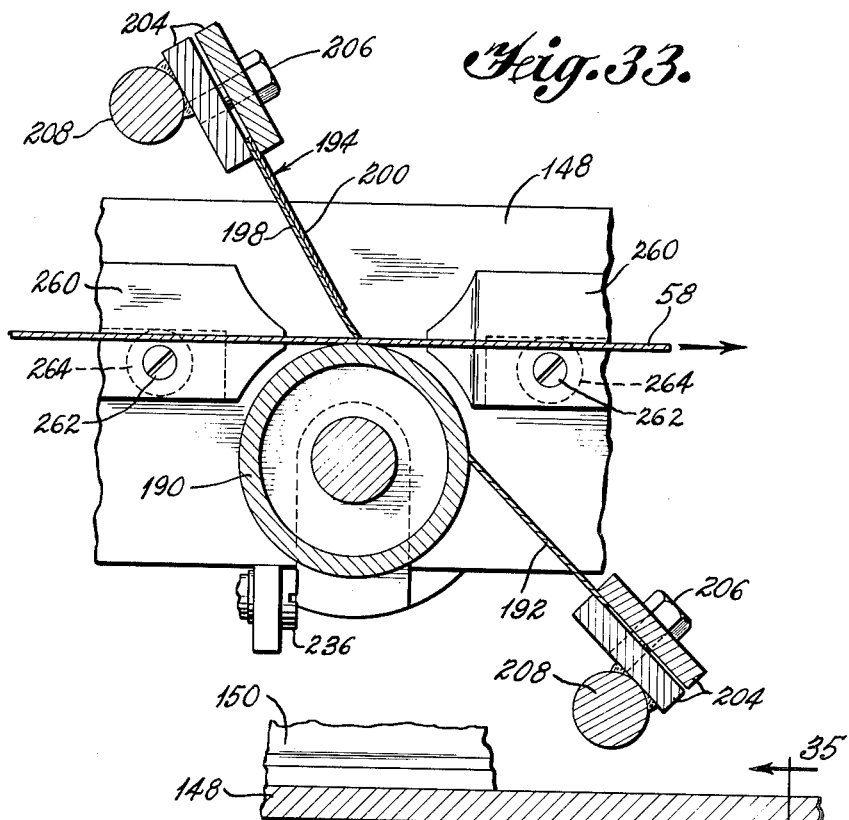
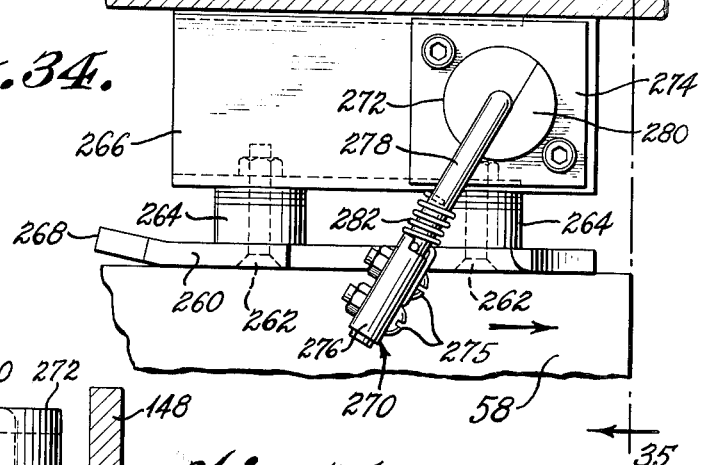
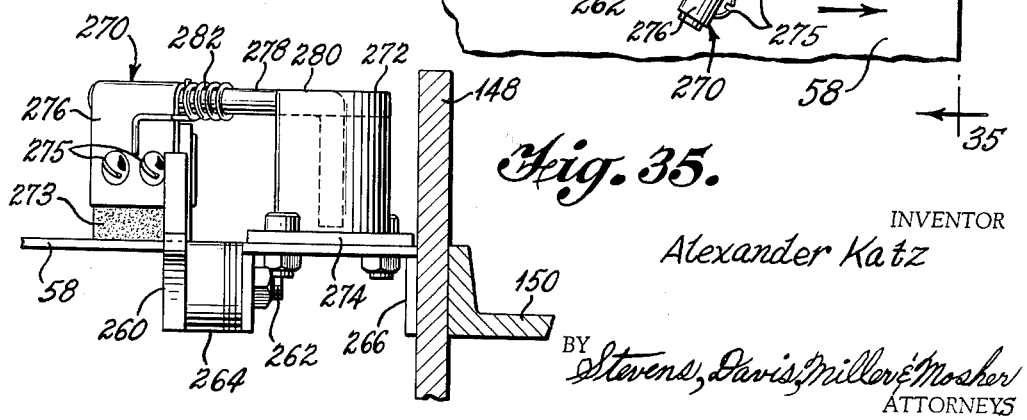
INVENTOR
Alexander Katz
BY Stevens, Davis, Miller & Mosher
ATTORNEYS

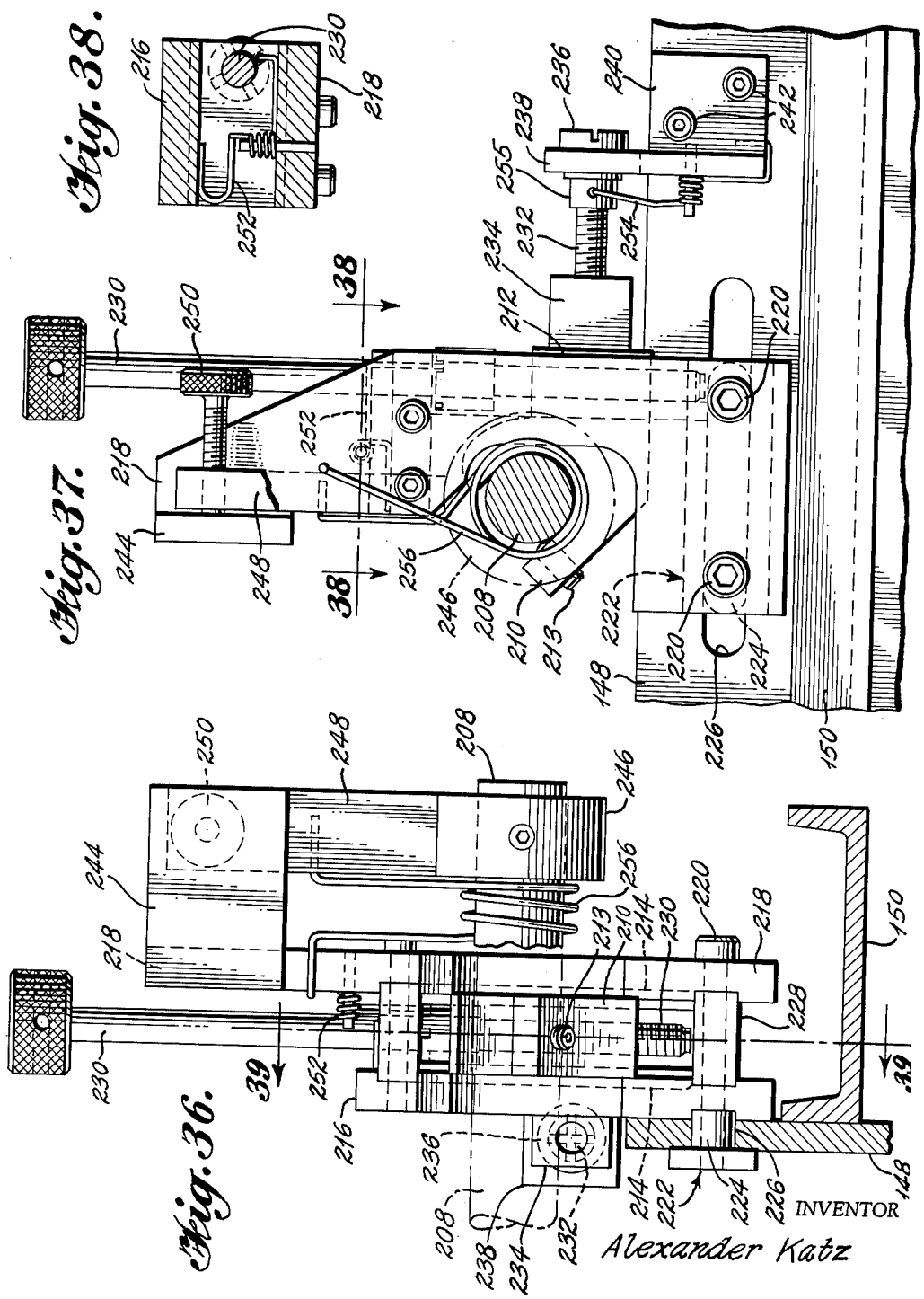

Aug. 17, 1965  A. KATZ  3,200,439
PLASTIC DIE-MOLDING APPARATUS
Filed Dec. 12, 1962  33 Sheets-Sheet 31

INVENTOR
Alexander Katz
BY
Stevens, Davis, Miller & Mosher
ATTORNEYS

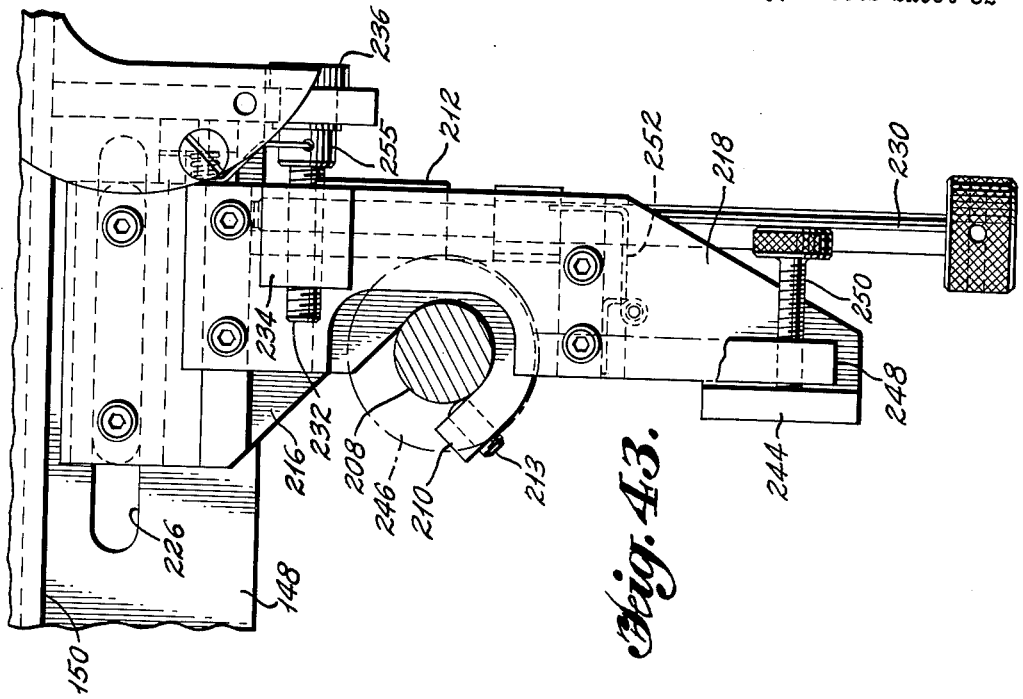
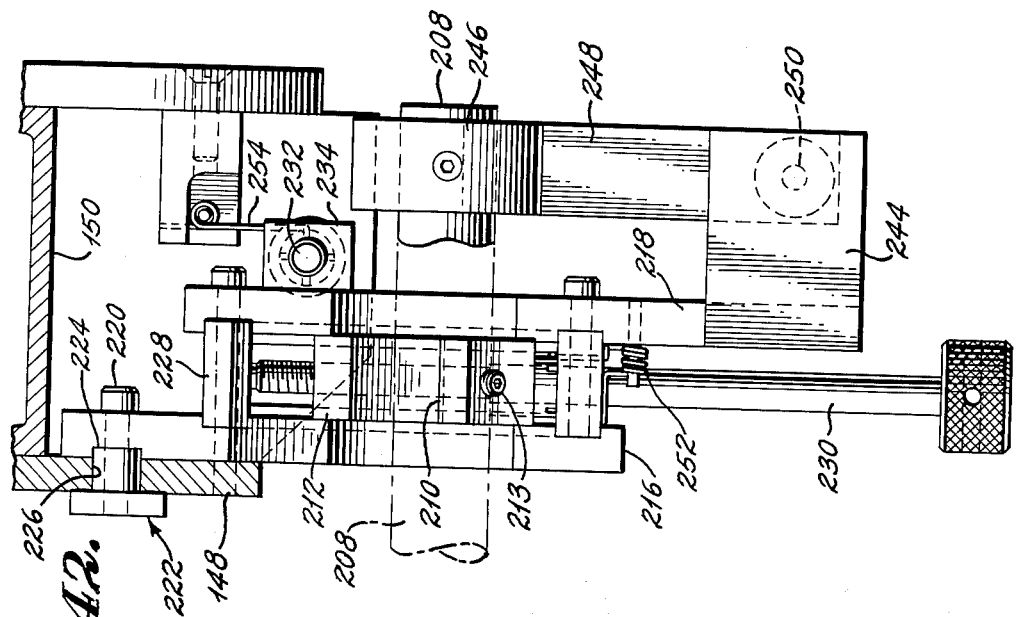

Aug. 17, 1965 A. KATZ 3,200,439
PLASTIC DIE-MOLDING APPARATUS
Filed Dec. 12, 1962 33 Sheets-Sheet 33

INVENTOR
Alexander Katz
BY
Stevens, Davis, Miller & Mosher
ATTORNEYS

United States Patent Office 3,200,439
Patented Aug. 17, 1965

3,200,439
PLASTIC DIE-MOLDING APPARATUS
Alexander Katz, New York, N.Y., assignor to EFKA Plastic Corporation, Bayonne, N.J., a corporation of New Jersey
Filed Dec. 12, 1962, Ser. No. 244,144
24 Claims. (Cl. 18—4)

The present invention relates to a molding apparatus or device and more particularly, to such an apparatus for making plastic objects such as doily sheets and the like.

It is an object of the present invention to provide a molding apparatus in which a die plate, having a mold cavity with the configuration of a plastic sheet doily to be molded, is passed through a coating machine or apparatus, and the plastic material is deposited on the die plate and thereafter the die plate passes through a series of situations so that the plate and parts of the mechanism is wiped clean of the excess plastic material and the die plate is then passed into an oven for curing and setting the plastic doily after which the die plate is passed through a cooling apparatus, and thereafter is passed through a stripping apparatus wherein the completed plastic sheet is stripped or separated from the die plate.

It is another object of the present invention to provide an automatic apparatus for cleaning the die plate after the plastic doily or sheet material has been removed therefrom by passing the die plate through a soaking and washer and brushing apparatus so as to remove plastic particles from the die plate, after which the die plate is again ready for passing through the coating machine embodied in the invention to begin the cycle of operation over again.

It is another object of the present invention to provide a washing and brushing machine having a plurality of roller members therein which brush the die plate as it passes through the machine which rollers may be readily adjusted with respect to each other and which may further be readily replaced and easily removed from the machine for individual maintenance thereof.

It is another object of the present invention to provide a soaking machine in which the die plate is passed through a solvent after the molded plastic article has been separated therefrom, so as to remove any plastic left on the plate, and which soaking machine is provided with pivotally connected means adjacent the front end of the washing and brushing machine and is adjustable with respect thereto and further, has the support roller means in the interior of the frame adjustable so that they may be raised or lowered to incline the path of travel of the die plate therethrough at different angles of inclination.

It is another object of the present invention to provide, a washing and brushing machine for passing a die plate therethrough, for scrubbing it clean, and which is positioned between the soaking machine and the coating machine so that the die plate may pass through the three machines in a continuous sequence.

It is another object of the present invention to provide, a coating machine for coating a die plate passed therethrough so as to mold a plastic sheet of material into a doily and the like in which the coating machine has its drive mechanism and chain drive disposed outside of the die plate area into which the plastic material is discharged to eliminate any plastic coating getting on the sprocket wheels and chains.

It is another object of the present invention to provide, a coating machine having complementary roller means that provide positive traction with a die plate passing therethrough and with at least one set of rollers always in contact with the die plate as it passes through the coating machine.

It is another object of the present invention to provide, a coating machine for a die plate in which the drive rollers are adjustable with respect to each other so as to properly provide the positive traction and frictional pressure required on the die plate passing therethrough.

It is another object of the present invention to provide, a coating machine having doctor blade means thereon which are adjustable with respect to the roller support means over which the die plate passes so that they may properly clean the plastic coating off of the roller means.

It is another object of the present invention to provide, a coating machine having wiper blade means thereon for wiping excess plastic material off of the die plate and which wiper blade means are readily adjustable with respect to the die plate passing through the machine.

It is another object of the present invention to provide, a coating apparatus having side plate guide means for a die plate passing therebetween which are readily adjustable with respect to the die plate.

It is another object of the present invention to provide, an edge wiper blade or member that is adjustable with respect to the die plate passing therebelow for cleaning off excess plastic material from the die plate.

It is yet another object of the present invention to provide, a coating machine for passing die plates therethrough that has most of the parts thereof so mounted that they may be individually replaced or individually serviced if required without completely disassembling the coating machine.

Various other objects and advantages of the present invention will be readily apparent from the following detailed description when considered in connection with the accompanying drawings forming a part thereof and in which:

FIGURE 1 is a schematic drawing of the cycle of operation embodied in the coating method of the present invention;

FIGURE 2 is a vertical longitudinal sectional view of the soaking machine embodied in the present invention;

FIGURE 3 is a vertical longitudinal section of the washing and brushing machine embodied in the present invention;

FIGURE 4 is a vertical longitudinal section of the rear end portion of the brushing machine;

FIGURE 5 is an elevational view of the inlet door of the soaking machine taken along lines 5—5 of FIGURE 2;

FIGURE 6 is a section of the inlet door taken along lines 6—6 of FIGURE 5;

FIGURE 7 is a vertical transverse view taken on lines 7—7 of FIGURE 2 of the soaking machine;

FIGURE 8 is a vertical transverse section taken on lines 8—8 of FIGURE 2, the soaking machine;

FIGURE 9 is a side elevation of the discharge end conveyor which transfers the die plate to the oven conveyor;

FIGURE 10 is a section taken on lines 10—10 of FIGURE 44;

FIGURE 11 is a side elevation of the inlet end of the coating machine with the sprocket and chain drive omitted for purposes of clarity;

FIGURE 12 is a view similar to FIGURE 11 but illustrating the rear end portion of the coating machine;

FIGURE 13 is a transverse vertical sectional view taken on lines 13—13 of FIGURE 11;

FIGURE 14 is a transverse section taken on lines 14—14 of FIGURE 13;

FIGURE 15 is a transverse section taken on lines 15—15 of FIGURE 11;

FIGURE 16 is a transverse section taken on lines 16—16 of FIGURE 11;

FIGURE 17 is a transverse section taken on lines 17—17 of FIGURE 12;

FIGURE 18 is a transverse section taken on lines 18—18 of FIGURE 12;

FIGURE 19 is a transverse section taken on lines 19—19 of FIGURE 12;

FIGURE 20a is a top plan view of the front end of the coating machine showing the upper rollers disposed directly below the plastic feed hopper with other portions left out for purposes of clarity;

FIGURE 20b is a top plan view of the rear end of the coating machine similar to FIGURE 20a.

FIGURE 21a is a top plan view of the front end of FIGURE 11 showing the back up or support rollers upon which the die plate is carried through the coating machine;

FIGURE 21b is a top plan view of the rear end of the coating machine, similar to FIGURE 21a;

FIGURE 22 is a fragmentary plan view of the frame and trough below the plastic feed hopper with certain parts omitted for purposes of clarity;

FIGURE 23 is a plan view of the drive motor taken on lines 23—23 of FIGURE 12;

FIGURE 24a is a diagrammatic right hand elevation of the roller drive direction and speed;

FIGURE 24b is also a diagrammatic view and a right hand elevation of the drive roller speed and direction;

FIGURE 25a is a left hand elevation diagrammatically showing the direction and speed of the roller drive;

FIGURE 25b is also a left hand elevation showing the roller drive speed and direction;

FIGURE 26 is a side elevation partially in section of the feed roll bearings on the right hand side of the machine;

FIGURE 27 is a top plan view partially in section taken along lines 27—27 of FIGURE 26.

FIGURE 29 is a sectional view taken along line 29—29 of FIGURE 27;

FIGURE 31 is a sectional view on line 31—31 of FIGURE 30;

FIGURE 32 is a sectional view taken along line 32—32 of FIGURE 31;

FIGURE 33 is a longitudinal section of the coating machine showing the cooperation of a back-up roller, wiper blade, doctor blade and a die plate passing through;

FIGURE 34 is a top plan view of edge-wiping plate;

FIGURE 35 is a sectional view taken along line 35—35 of FIGURE 34;

FIGURE 36 is a front elevation of wiper-blade support and adjustment bracket;

FIGURE 37 is a side elevation of bracket shown in FIGURE 36;

FIGURE 38 is a section on line 38—38 of FIGURE 37;

FIGURE 42 is a front elevation of doctor-blade bracket;

FIGURE 43 is a sdie elevation of doctor-blade bracket;

FIGURE 44 is a side elevation of fragment of frame with brackets omitted; and

FIGURE 45 is a section on line 45—45 of FIGURE 44;

Figure 28:
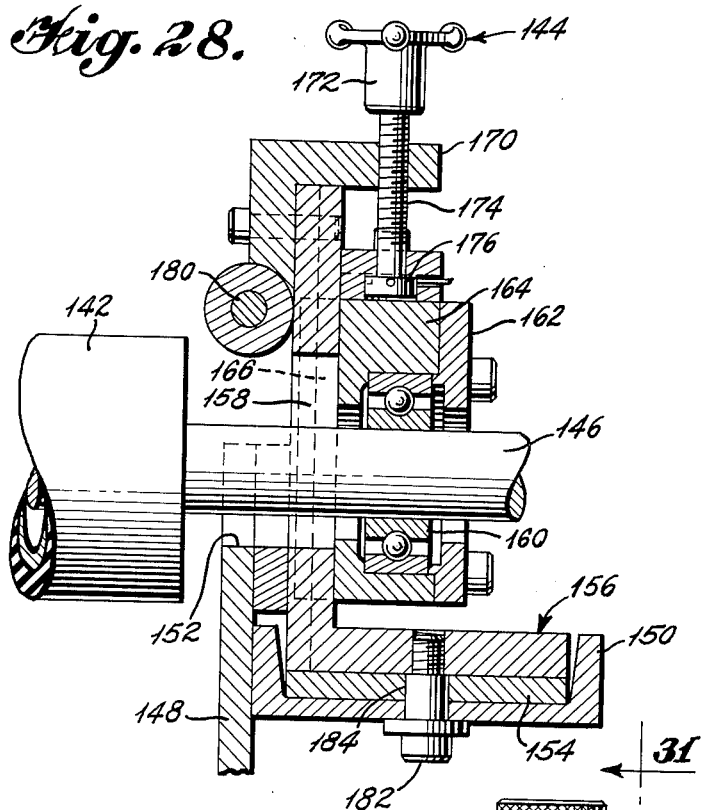
FIGURE 28 is a sectional view on lines 28—28 of FIGURE 27.

FIGURE 1 illustrates a diagrammatic view of the present invention illustrating the cycle of operations. The die plate for molding a doily of plastic sheet material is first passed through a soaking machine 10. The soaking machine is provided with a liquid solvent therein for removing any plastic left on the die plate after the plastic sheet material has been stripped from the die plate.

After the die plate has been immersed in the solvent it then passes through a washing and brushing machine designated 12, wherein a plurality of rotating brushes clean the surfaces of the die plate to remove any plastic thereon.

Thereafter, the clean die plate is then passed through a coating machine 14 and plastic material is discharged onto the die plate to fill the mold cavity therein. After the die plate leaves the coating machine 14 it then passes through an oven 16 wherein the plastic material is cured by heating. The die plate then passes through a cooling machine or zone 18 so that the plastic material will harden and set. Thereafter, the die plate passes through a stripping machine 20 wherein the molded plastic sheet material doily is then stripped from the die plate after which the die plate is then returned to the soaking machine and again passes through the same cycle of operation to produce or fabricate another doily plastic sheet.

Figure 47:
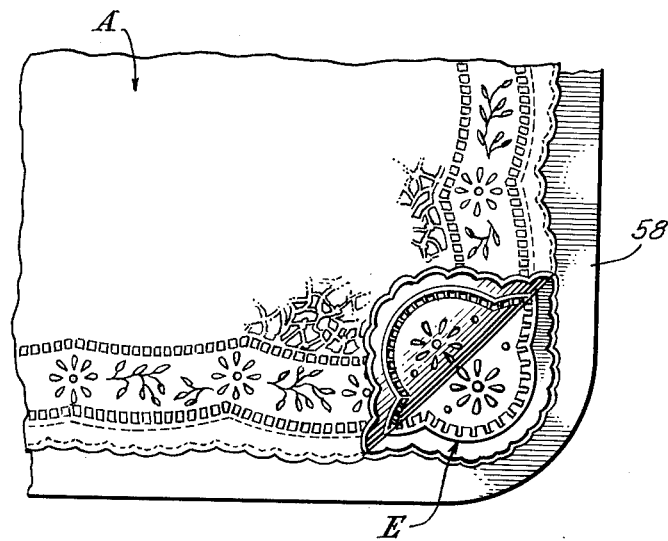

FIG. 47 shows the completed doily or other plastic sheet article A as it is being stripped from the cavity E, beginning at the lower right corner of plate 58.

Referring to FIGURES 2, 7 and 8, the soaking machine 10 comprises a longitudinally extending machine having a closed or airtight casing or housing 22 with a front inlet end or wall 24 with oppositely disposed vertical side walls 26 and 28 (see FIGURE 8) and a top wall 30. The side walls 26 and 28 and front wall extend all the way to the ground or to the surface upon which the foundation or base members 32 are disposed, so as to form an airtight housing or casing. The base members 32 comprise channel members extending longitudinally of the housing on opposite sides thereof and have a plurality of spaced vertically extending channel members 34 fixed thereto. The channel members 34 are disposed within the airtight housing and have longitudinally extending horizontal channel members 36 fixed to the upper ends thereof for supporting a trough member 38 (FIGURES 2 and 8) U-shaped in cross section for containing the liquid solvent therein to dissolve and clean the die plates of plastic material remaining thereon after it leaves the stripping machine. The trough member 38 has a plurality of transverse channel members 40 spaced longitudinally thereof and fixed thereto to support it. The bottom of the trough member 38 is diagonally inclined in an upward direction from the inlet end 24 upwardly to the outlet end of the soaking machine as best seen in FIGURE 2. The outlet end of the soaking machine indicated at 42 is connected to the inlet end of the brushing machine 12 and forms an integral or continuous housing therewith. The inlet end of the trough member 38 adjacent inlet end wall 24 is provided with a drain trough 44 and a drain spout 46 for removing the solvent from the trough member when desired. An exhaust outlet opening or port 48 is also provided in the top wall 30 of the soaking machine for permitting the highly volatile solvent gases or vapors to be withdrawn from the interior of the housing.

Thus far, the stationary portion of the soaking machine has been described which stationary portion includes the fixed structural frame members or channel members and the trough member 38 fixed thereto and the airtight casing or housing. Disposed within the trough member 38 is a movable or adjustable roller frame portion generally designated 50 as best seen in FIGURES 2 and 8. The adjustable roller frame portion 50 comprises longitudinally extending angle iron members 52 disposed on opposite sides of the trough member 38 as best seen in FIGURES 7 and 8 with the members 52 fixed or connected together adjacent their opposite ends by transverse angle irons 54 (see FIGURE 2). The members 52 and 54 are fixed to two spaced ears or hinges 56 (see FIGURE 2) disposed on opposite sides of the trough member 38 so that the entire roller frame 50 is pivotally connected to the brushing machine 12. The adjustable roller frame member 50 supports the rollers in the soaking machine along which the die plate 58 is carried and travels. The frame 50 has its vertical position spaced with respect to the bottom of the trough member 38 by adjusting the nut members 60 on the threaded adjustable foot members 62 which are threaded through the angle irons 52 and are supported on the bottom of the trough member 38, as shown in FIGURES 2 and 7 so that the adjustable frame will pivot about the pin members 64 to which the ears 56 are pivotally connected.

A plurality of transversely disposed die plate support roller members 68 (FIGURES 2 and 8) are carried by the members 52. The roller members 68 are secured to the members 52 by pairs of threaded bolt members 70 which carry roller bearings 72 therebetween on opposite ends or sides of the roller 68.

The die plate enters the soaking machine housing through an inlet door 74 extending across the inlet wall 24 of the housing.

Referring to FIGURE 6, the inlet door 74 is hingedly connected as at 75 to the front wall 24 and is provided with a counter weight 78 thereon with the inlet door pivoting upwardly as the die plate 58 enters the casing. The rollers adjacent the inlet end of the door comprise a pair of nip rollers 80 (see FIGURE 7) which pull the die plate therebetween into the housing and discharge it onto the support rollers 68, the liquid solvent being disposed in the trough member 38 at this time so that the die plate is immersed therein and the plastic material that may be on the die plate can be readily dissolved in the solvent. Adjacent the rear end portion of the soaking machine, are other pairs of nip rollers 82, the bottom roller of the pair of rollers being substantially the same as the support rollers 68, while the upper roller of the pair of rollers constitutes a disc roller 84 as best shown in FIGURE 8. The nip rollers 80 and rollers 82 are both provided with means for biasing the upper roller toward the lower cooperating roller and will be described in connection with FIGURE 8. The upper rollers 84, as well as the lower roller 82 (see FIGURES 2 and 8) are journalled in roller bearings 72 carried by threaded members 86 secured to the bottom of the trough member 38 similar to members 70. The roller bearing 72 of the upper roller 80 and 82 is urged toward the mating lower roller member by spring members 88 disposed on the upper end of the threaded members 86. A nut or collar 90 fixed to the upper end of the threaded member 86 has the upper end of a spring 88 bearing thereagainst so as to cause the spring to urge the upper roller member toward the lower roller member to grip the die plate passing therethrough and to pull it through the housing.

The disc rollers 84 are provided with a shaft 92 that has its opposite ends carried by two sets of threaded members 86 and roller bearings 72 as best seen in FIGURE 8 for purposes of stability, while the full rollers 68 require only one bearing 72 on each end of its shaft. A nut 60 and adjustable foot 62 is provided on the lower end of 86 similar to the adjustment means for members 70, to raise and lower the rollers with respect to the trough 38.

All of the roller shafts are provided with sprocket wheels fixed on the outer ends thereof so that the roller chains may be connected thereto and all of the rollers driven in unison. The direction of rotation of the rollers is clearly indicated in FIGURE 2 so that the die plate 58 is moved from the inlet end 24 through the casing or housing of the soaking machine and is thereafter discharged onto an endless conveyor belt 96 in the brushing machine 12. All of the sprocket wheels and roller chains connected to the rollers in the soaking machine are driven through a pair of sprocket wheels 98 disposed on the inlet end of the brushing machine 12, as best seen in FIGURE 2.

The casing 104 or housing of the brushing machine 12 is formed integral with the housing of the soaking machine 10 as shown at 42 in FIGURE 2 so that it provides an airtight compartment with the soaking machine. The casing 104 (see FIGURE 3) of the brushing machine is formed by a plurality of vertical and horizontal channel members all supported on the base 32.

An inner horizontal frame, designated 108 (FIGURE 3), is provided in the brushing machine for supporting a plurality of alternate mating drive rollers and cylindrical brushes disposed longitudinally of the machine and extending transversely thereof, which mated rollers are designated 110; and the brushes, 111. Each of the rollers is provided with a roller bearing member 112 on opposite ends thereof carried by the stationary frame. Each of the upper rollers in the brushing machine is provided with a threaded member 114 that is carried in a split ring member 116, provided with a tension spring so that the upper roller 110 of each of the mating rollers is biased toward the lower complementary roller 110. Brush rollers 111 are supported by bearing members 113 and the bearings for the upper brushes are vertically adjustable by means of threaded member 115, threaded lug 117 secured to upper frame member 108 and lock nut 119.

The die plate traveling on the endless conveyor belts 96 passes between the first pair of rollers 110 and thereafter in succession through the remaining brush and drive roller pairs in the brushing machine so that the brushes can wipe off the plastic material that may remain on the die plate after it has left the soaking machine. The direction of the rotation of the brushes or the brush rollers and the drive chains and sprockets is clearly indicated by arrows in the drawings. All of the rollers are driven in tandem drive operation, similar to the drive operation for the soaking machine, from the motor 116 located within the brush housing and below the stationary frame 106 and 108, with motor 116 also driving the roller and sprocket wheels in the soaking machine through the gear connection 98 adjacent the front end of the brushing machine, as shown in FIG. 2. The rollers adjacent the rear end portion of the brushing machine are driven from a beveled gear shaft connected to a beveled gear not shown, which shaft is designated 118 in FIGURE 3. The beveled gear on shaft 118 meshes with a bevel gear (not shown) on the shaft 120 shown in FIGURE 4 which is provided with a beveled gear 122 for driving the complementary rollers 110 adjacent the rear end of the brushing machine.

It is also to be noted that the brushing machine is provided with an exhaust outlet opening 124 in the top wall thereof. When the die plate has passed through all of the brushing rollers, it passes through a door 74 onto the endless belt 126 in chamber 125 and thereafter passes through an outlet door 74 similar to the other two doors 74 in the soaking and brushing machine. Chamber 125 is closed from the brushing machine by vertical wall 121 and door 74 and acts as a safety air lock to prevent solvent fumes escaping from the soaking and brushing operation. Any such fumes escaping into chamber 125 are exhausted through conduit 123.

The rear end of the brushing machine is provided with two complementary drive rollers 110 beyond the last outlet door 74 therefore moving the die plate on to the conveyor 130 which feeds the die plate into the coating machine 14 as shown in FIGURE 11. The coating machine is supported on the base 32 and comprises a longitudinally extending frame which carries a trough member 132 between the vertical members 134 of the frame. The coating machine is provided with a transversely extending feed hopper 136 adjacent the front end thereof for discharging liquid plastic onto a die plate as it passes therebelow in order to fill the mold cavity in the die plate with plastic material to form the plastic sheet doily. The coating machine is also provided with a plurality of roller stations including drive rollers for moving the die plate through the coating machine and which stations have wiper blades, doctor blades and edge wiper means, and side guide plates for guiding the movement of the die plates through the machine. Adjacent the front end or inlet end of the coating machine is a pair of nip rollers 138 and 140 which pull the leading edge of the die plate therebetween to move it underneath the plastic feed hopper 136. The rollers 138 and 140 and the other rollers in the coating machine are supported at their opposite ends by frame members 134 of the coating machine.

Referring to FIGURES 13 and 14, the feed rollers 142 disposed directly below the hopper 136 and between which rollers the plastic material is fed onto the top of the die plate 58, are adjustable vertically and laterally with respect to one another by adjustment means generally designated 144. The opposite ends of the rollers 142 are provided with a shaft 146 and are carried by a side rail member 148 which is connected to the side frames 134. The side rails 148 have a channel member or plate 150 secured to the outerside thereof with the shafts 146 extending through U-shaped notches 152 (FIGURES 26, 28) in the plate 148. The channel member 150 is provided with a plate 154 welded thereto on which is disposed an L-shaped bracket 156. The L-shaped bracket 156 is provided with a vertical slot 158 therein through which the roller shaft 146 passes. The end of the shaft 146 is provided with a roller bearing 160 and a roller bearing cover 162 is bolted to the bearing housing 164. The L-shaped bracket 156 is provided with guides or outwardly extending shoulders 166 (see FIGURE 27) adjacent its vertical leg which receive mating inturned shoulders or guides 168 on the bearing housing 164 so that the bearing housing 164 may be slid or moved in a vertical direction upwardly and downwardly along the vertical leg of the L-shaped bracket 156 in order to adjust the vertical height of the roller 142. A carrier or support member 170 is secured to the inner vertical leg of 156 and is provided with a hand wheel member 172 having a threaded portion 174 extending through the bearing housing 164. The lower end of the threaded handwheel member 174 is provided with a circular collar 176 thereon which turns in the roller bearing housing 164 or when the handwheel is rotated. By rotating the handwheel in one direction, it will lower the bearing housing 164 and the roller shaft 146 therewith, while rotating the handle in the opposite direction will raise the shaft 146 and the roller 142 for vertical adjustment thereof. The carrier member 170 may be provided with a notched collar and spring member arrangement to prevent the handwheel from coming loose due to vibration in the machine after it has once been set in the desired position to properly adjust the roller 142.

The rollers 142 are adjusted laterally with respect to each other, by a lateral adjustment means designated 180 threadably engaged in support member 170 as best seen in FIGURES 26 and 27. Before turning the knurled handle of the threaded lateral adjustment member 180, in order to adjust the two rollers laterally with respect to one another, it is first necessary to loosen the threaded members 182 extending through the slot 184 in the plate member 154 below the forward roller 142. Thereafter the adjustment member 144 adjacent the forward end of the coating machine may be slid or moved to the left or the right by rotating the knurled member 180 to the proper setting, after which the screw members 182 are again threaded home so that the two feed rollers are rigidly fixed with respect to the frame of the coating machine. A notched collar 186 and spring member 188 connected to the knurled member 180 prevents the lateral setting of the two rollers from coming loose due to vibrations of the machine.

Referring to FIGURE 14, it will be noted that the two rollers 142 are rotated in opposite directions as indicated by the arrows therein. The forward of the two rollers, or the one adjacent the front end of the machine is not a feed roller for the die plate but instead cooperates with the other roller 142 in order to properly feed the plastic material onto the top of the die plate. Therefore, as is clearly seen in FIGURE 14, the lowest horizontal plane of the forward roller 142 is spaced slightly upwardly from the lowest horizontal plane of the rear roller 142 so that the forward roller 142 cannot contact the die plate 58. In other words, with both rollers 142 being of the same diameter, as in FIGURE 14, the rotational axis of the forward roller 142 is higher than that of the rear roller 142. The rearward of the two rollers 142 cooperates with a lower drive or support roller 190 to pull the die plate 58 therebetween to feed it to the successive rollers following. The roller 190 and the other lower support or drive rollers located toward the rear of the coating machine, as well as the similar roller forward of the roller 190 and in the same plane therewith, are provided with doctor blades 192 for scraping and removing any plastic material that may get on the peripheral surface of the roller.

The coating machine is also provided with a number of wiper blades similar to the doctor blades 192 except that the wiper blades 194 are disposed to wipe excess plastic material off of the top of the die plates 58 as they pass through the coating machine. The doctor blades 192 and the wiper blades 194 are both carried by the side rails 148 connected to the channel member 150 of the frame.

Figure 39:
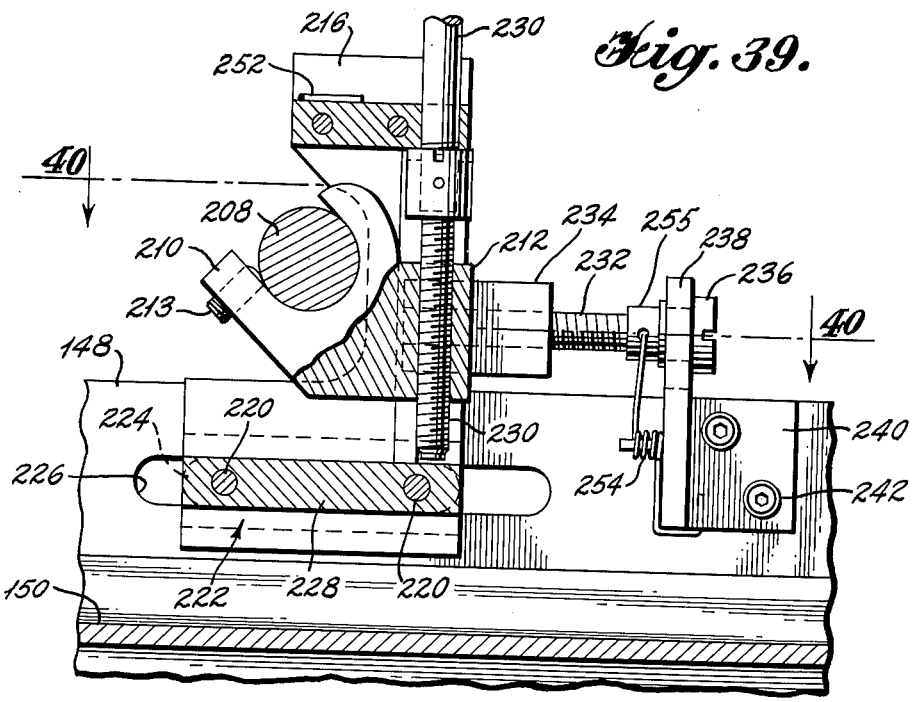
FIGURE 39 is a section on line 39—39 of FIGURE 36.

The wiper blade as best shown in FIGURES 36–41 comprises a transverse flexible plate member (see FIGURE 33) 198 with a back-up member 200 having their inner ends 202 sandwiched between two plate members 204 that may be drawn together by bolt members 206. One of the plate members 204 is welded to a transversely extending bar or rod member 208. The wiper blade is carried on the coating machine and is provided with vertical adjustment means, longitudinal adjustment means, and means for rotating or turning the angle of the blade with respect to the die plate 58. The rod member 208 is carried in or between the jaws 210 (FIGURE 39) of a support member 212. A set screw 213 maintains and keeps the bar member 208 in the U-shaped jaws so it will not fall out of it. The jaws 210 are formed integral with the support member 212. Support member 212 extends in a substantially vertical direction and is provided with vertical keys 214 (see FIGURE 40) therein so that the support member 212 may be moved or adjusted vertically with respect to the side rail 148 of the frame. The keys 214 are disposed in two side plate members 216 and 218 on opposite sides of the support member 212. The plate members 216 and 218 are connected to the side rail 148 by two bolt members 220 threaded through an elongated block member 222 disposed adjacent the inner side of the rail 148 as shown in FIGURE 36. The block member 222 is also provided with a longitudinally extending key 224 on the front side thereof which is disposed in an elongated slot 226 as shown in FIGURE 39, of the side rail 148. A horizontal plate member 228 is disposed between the plate 216 and 218 as shown in FIGURE 36 adjacent the lower portion thereof and the screw members 220 extend through this plate 228. A knurled vertical adjustment member 230 is threaded through the support member 212 and has its lower end adjacent the plate 228 so that the knurled member 230 may be threaded in one direction or the other to abut the plate 228 and to slide the support member 212 upwardly or downwardly and the wiper blade carried thereby to adjust the vertical distance of the wiper blade with respect to the die plate 58.

Figure 40:
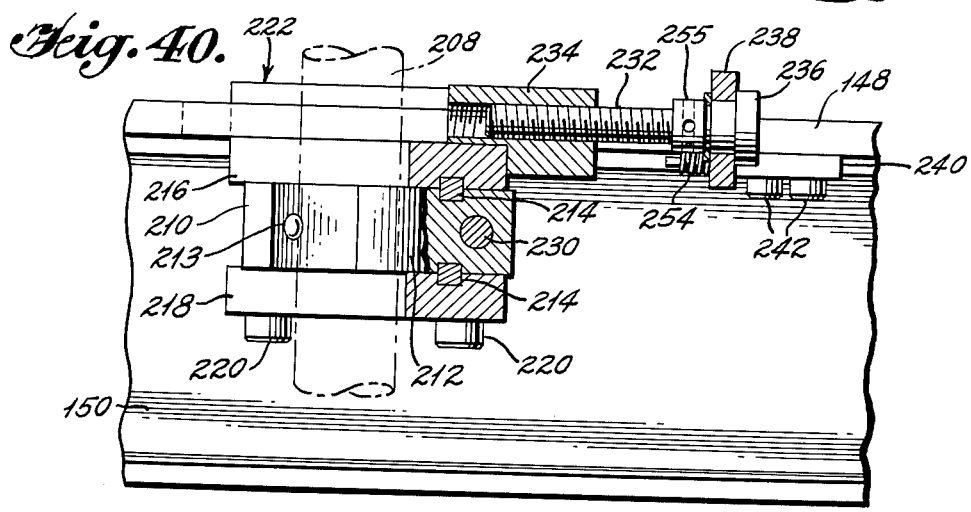
FIGURE 40 is a section on line 40—40 of FIGURE 39.
Figure 41:
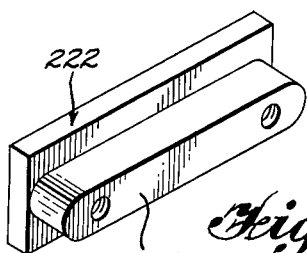
FIGURE 41 is an isometric of key cooperating with bracket and frame to adjust bracket position.

The longitudinal or lateral adjustment of the wiper blade is accomplished by a threaded longitudinal adjustment member 232, as shown in FIGURES 39 and 40, disposed in a horizontal block 234 fixed to the inner plate member 216. The screw head 236 of the longitudinal adjustment member 232 extends through a vertical plate 238 formed integral with a longitudinally extending plate 240 that is bolted by members 242 to the side rail 148. In order to adjust the wiper blade longitudinally of the frame it is first necessary to loosen the bolt members 220, thereafter the screw head 236 may be rotated so as to force or move the member 234 in one direction or the other and thereby slide the wiper blade longitudinally of the frame. After the proper adjustment has been made, the bolts 220 are again tightened.

The outer vertical plate member 218 is provided with a transverse or laterally extending ear 244 thereon, while the outer end of the rod 208 is provided with a loop or ring member 246 terminating in a vertical leg or member 248. The loop member 246 and the leg 248 are fixed to the outer end of the rod 208 by a set screw. An angle adjustment screw 250 as shown in FIGURE 37 is threaded through the leg 248 and abuts the ear 244. The angle of the wiper blade is adjusted by the screw member 250 by turning or rotating it so as to move the leg portion 248 toward or away from the ear member 244.

The vertical adjustment member 230 is prevented from being moved from its proper setting by vibration and the like by a spring member 252 as best shown in FIGURE 38 having one end disposed in a notched collar carried on the vertically adjustable member 230. The longitudinally adjustable member 232 is prevented from coming loose from its predetermined setting by a similar tension spring 254 having one end disposed in a notch in a collar member 255 carried by the member 232 and the other end of the spring wrapped around the vertical plate 238. The angle adjustment member 250 is prevented from becoming loosened from its predetermined setting by a similar tension spring 256 wrapped around 208 with its opposite ends disposed as shown in FIGURES 36 and 38.

The doctor blade assembly is substantially identical to the wiper blade assembly already described and the assemblies may be interchangeable and either used as a wiper blade or a doctor blade. The only difference between the two is the positioning of them on the carriage or frame. The assembly of the doctor blade is shown in FIGURES 42 and 43 and since the parts are identical, the reference numerals for the wiper blade or the doctor blade are identical. The doctor blade 192 has its blade turned upward as illustrated in FIGURE 33 while the wiper blade is positioned in a reverse direction that is with the blade extending in a downward direction.

The coating machine is provided with a plurality of side guide plate members 260, as best shown in FIGURES 22, 34 and 35. The side guide plates 260 are secured by bolt members 262 having cylindrical collars 264 thereon to a horizontally U-shaped bracket 266 fixed to the inner side of the rails 148. The guide plates are substantially vertical and have an outward turned leading edge 268 and are positioned so as to properly guide the die plates 58 therebetween as it travels through the coating machine. One pair of U-shaped brackets 266 immediately following the feed rollers on opposite sides of the coating machine also have connected thereto edge wiper plates 270 fixed to the top of the brackets 266 by cylindrical adapter members 272 each having a bottom plate or flange 274 thereon. Each edge wiper is provided with a wiping member 273 of rubber or other suitable material for cleaning the plastic off of the top side edges of the die plate 58. The wiper member 273 is secured between two thin plate members 276 by bolts 275. The rearwardly positioned plate member 276 is looped over a horizontally and diagonally extending bar 278, having its opposite end extending into the cylindrical member 272. The cylindrical member 272 is provided with a semicircular projection 280 as shown in FIGURE 34 against which the bar 178 bears. A set screw 281 as shown in FIGURE 14, permits the wiper member 270 to be positioned at any desired angle with respect to the die plate. A coiled tension spring 282 is mounted on the bar 278 and has one end extending downwardly adjacent the rear of the plate 276 so that the spring will normally urge the wiper plate material 273 downwardly against the top surface of the die plate 58 as it travels along the die plate, tending to push or twist the wiping material 72 upwardly therefrom.

Figure 46:
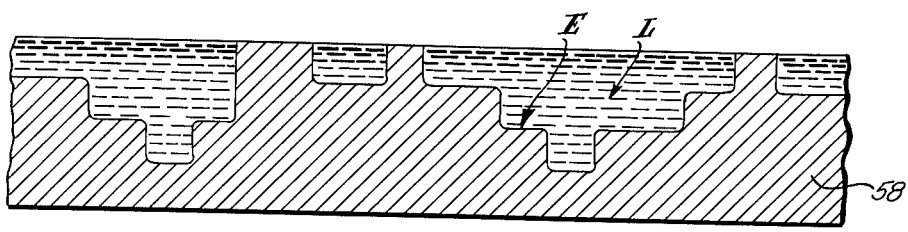
FIGURE 46 is a partial sectional view of a die plate, showing the plate engraved or etched portion full with plastic material; and, FIGURE 47 is a partial top view of the die plate showing the cured plastic material being stripped from the plate surface.

It will be seen in FIG. 46 that the engraved or etched cavity E in die plate 58 is full with liquid plastic material L right up to the uppermost surface of the plate but that said uppermost surface has been completely wiped clean of any overflow plastic material by the wiper blades.

Referring to FIGURES 11 and 12, it will be noted that the coating machine has a series of mating disc rollers 290 positioned therealong adjacent the lower support rollers 190 which rollers cooperate and coact with the lower rollers so as to pull the die plate 58 therebetween as it passes through the coating machine.

Figure 30:
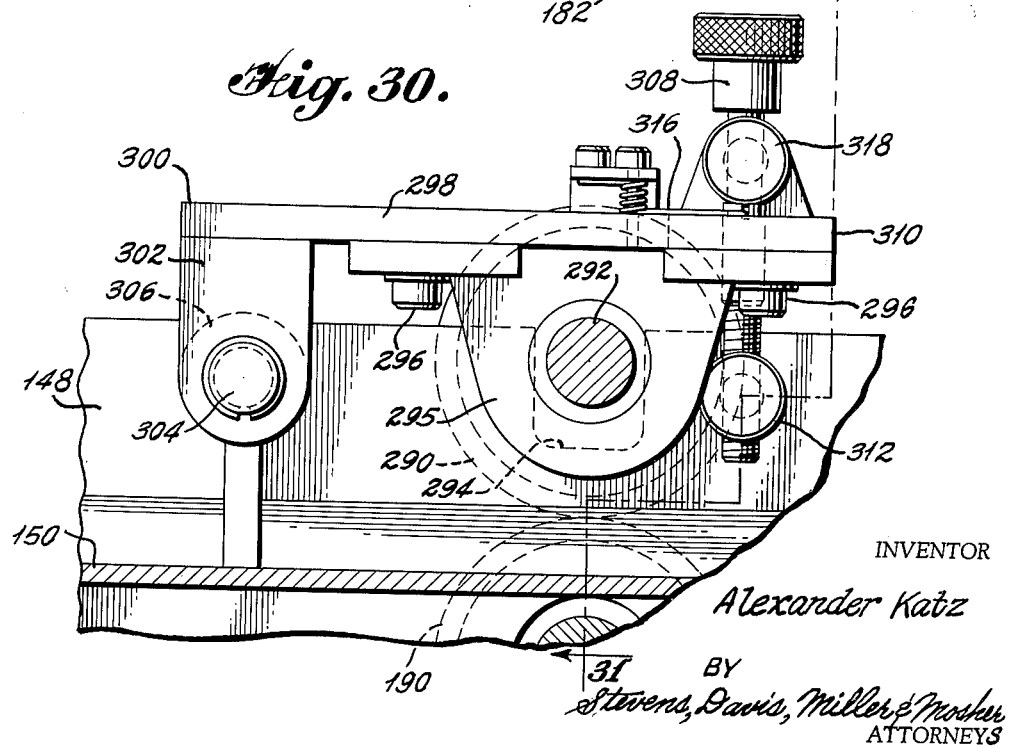
FIGURE 30 is a side elevation partially in section of a drive roller and its bracket.

The mating rollers 290 are disc rollers as best shown in FIGURE 31, and the vertically adjustable means are provided for adjusting these rollers with respect to the lower support rollers 190. The disc rollers each have a shaft 292 extending through a U-shaped notch 294 in the side rail 148 of the frame. The shaft 292 is provided with two bearings 295 disposed on opposite sides of the rail 148 as shown in FIGURE 31. The bearings are connected by bolts 296 to a transverse straddle plate or member 298 which straddles the side rail 148. The forward end of the straddle member 298 designated as 300 in FIGURE 30 is provided with depending or downwardly extending ears 302 through which a horizontal pin member 304 extends. The pin member 304 is journaled in a sleeve or pipe member 306 that is fixed to the rail 148 as shown in FIGURE 45, by welding or the like. Thus, the pin member 304 is pivotally connected to the side rail 148 through the medium of the sleeve or pipe member 306. A vertically adjustable knurled member 308 extends through the straddle member 298 adjacent the rear end 310 as shown in FIGURES 30 and 31. The lower end of the adjusting member 308 is threaded into a cylindrical member 312 that is connected to the outside of the side rail 148 by a bolt member 314. The member 308 is provided with a spring member 316 for preventing the adjusting member from being vibrated loose after it has been set at the proper setting. The straddle member 298 has another sleeve member 318 similar to the threaded sleeve member 312 connected to the top thereof by a bolt member 320. Thus, with the vertical adjustment means for the disc roller 290, it is merely necessary to actuate the knurled member 308 so as to move the disc roller 290 toward or away from the lower support roller 190 as the assembly is disposed to be pivoted about the pipe member 306 fixed to the side rail through the medium of the pin member 304.

Referring to FIGURE 31, the support rollers 190 extend through a notch 322 disposed in the lower portion of the side rail 148 and are supported by roller bearings 324 adjacent the opposite ends thereof which are disposed in a bearing housing 326 connected to the outer side of the channel member 150 of the frame to which the side rail 148 is connected.

Referring to FIGURES 15 and 16, the outer ends of the roller disc shafts 292 are provided with sprockets 328, and 330 while the support rollers 190 are also provided with similar sprocket members 332 and 334 adjacent one end only thereof as can be readily seen when comparing the figures in the sprocket wheels shown in FIGURES 15 and 16.

The motor drive 340 for the drive rollers and the support rollers of the coating machine is shown in FIGURES 12 and 23. A gear reducer mechanism 342 connected to the motor and shaft 344 coming out of the gear reducer mechanism rotates shaft 346 so that the chain belts and disc rollers connected through chain drives to the sprockets designated 350 in FIGURE 23 at opposite ends of the shaft 346, are driven at 90 r.p.m. as shown in the diagrams of FIGURES 24a, 24b, 25a, 25b and 21a. The drive shaft 352 shown in FIGURE 23 is also a drive shaft for connecting thereto rollers that are to be driven at 90 r.p.m., while the take off for the rollers to be driven at 108 r.p.m. is through the sprocket 354 on shaft 352, to the sprocket 356 on fast wipe roller 191 through a drive chain connection. All of the rollers that are driven including the disc rollers and the support rollers of the coating machine as shown in FIGURES 11 and 12, are driven from the motor 340 in FIGURE 23 through the chain connections as shown in the drawings, and thus are driven in the direction indicated by the arrows in the drawings. It will be noted in FIGURE 12 that there are two rollers 191 indicated as fast wipe rollers. These rollers are driven at slightly more than 108 r.p.m. through the proper chain drive connection and the mating disc rollers 291 indicated in FIGURE 12 as idler rollers, are the only idler rollers embodied in the coating machine. The purpose of the fast wipe rollers is to clean the bottom of the die plates 58 as they pass thereover. This is accomplished by the fact that the die plate is moving in accordance with the speed imparted to it by the 90 r.p.m. drive rollers and the passing or rotation of the fast wipe rollers thereagainst at a different and faster speed causes the roller to wipe the bottom of the plate to remove any plastic that may be thereon.

Thus from the foregoing detailed description, it is apparent that the present invention provides a molding apparatus including a soaking machine, a brushing machine, and a coating machine, having different stations therealong including rollers for moving the die plate to the plastic hopper feeding station, and with means for cleaning and scraping the die plate member, all of which rollers and cleaning means are individually and separably operable and adjustable and therefore can be adjusted and replaced readily without dismantling the machine so that the machine will not have a minimum of down time and unskilled workers can do it.

Although the present invention has been shown and described in details of a specific and preferred embodiment, changes and modifications are possible which do not depart from the inventive concepts. Such are deemed to be within the purview of the invention.

What is claimed is:

1. Apparatus for die-molding plastic sheet articles such as doilies, tablecloths, and the like, said apparatus comprising:
    (a) a flat faced die plate which defines a flat upper and lower surface, said plate having a design configuration indented from said upper surface downwardly into said plate;
    (b) a washing means for washing said die plate clean of any plastic material which may be adhered to said die plate, said washing means comprising a soaking machine and a brushing machine,
        (1) said soaking machine comprising a liquid-holding trough member adapted to hold a liquid solvent therein at a certain liquid level, first conveyor means adapted to carry said die plate through said trough member in an upwardly inclined path from a position below said liquid level to a position above said liquid level;
        (2) said brushing machine comprising a second conveyor means which includes a plurality of successive conveyor rollers, a plurality of successive brush means alternately interposed between said conveyor rollers, said brush means comprising opposed brush members adapted to receive said die plate therebetween, said conveyor rollers rotating so as to introduce said die plate to between successive ones of said brush members;
    (c) a conveyor means for carrying said die plate from said brushing machine to a coating apparatus;
    (d) a coating apparatus, comprising a conveyor means for moving said die plate, feed means for feeding plastic material onto said die plate upper surface, wiper means adapted to wipe clean said die plate upper surface;
    (e) heating means for heating said die plate to thereby cure said plastic material which is contained in said indented design configuration.

2. The apparatus of claim 1, said soaking and brushing machines comprising a sealed outer casing comprising an inlet to said soaking machine and an outlet from said brushing machine and wherein the soaking and brushing operations occur, said casing comprising a self-closing die plate entrance door at the inlet to said washing machine and a self-closing exit door at the outlet from said brushing machine.

3. The apparatus of claim 1, wherein said first conveyor means comprises a plurality of rollers rotatably mounted on a frame, said trough member comprising a front and a rear end, said frame supporting said rollers in said trough member along an upwardly inclined plane from the front to the rear end of said trough member, means to vary the inclination of said inclined plane.

4. The apparatus of claim 3, wherein said means to vary the inclination of said plane comprises, said frame having a front and rear end and being pivotably mounted at its rear end which is adjacent to the rear end of said trough member, and vertically adjustable means supporting the front end of said frame.

5. The apparatus of claim 2, wherein said brushing machine comprises a brushing chamber and an air lock chamber, both chambers being sealingly enclosed by said outer casing and being separated from each other by a sealing wall, a self-closing inlet and outlet door, respectively, at the inlet and outlet of said air lock chamber, a third conveyor means in said air lock chamber, said second conveyor means being adapted to pass said die plate through said air lock inlet door and onto said third conveyor means which in turn is adapted to pass said die plate through said air lock outlet door and into said coating apparatus.

6. The apparatus of claim 5, wherein said outer casing comprises an exhaust vent leading from said air lock chamber and adapted to exhaust volatilized solvent from said air lock chamber.

7. The apparatus of claim 1, wherein said coating apparatus feed means comprises a hopper and facing feed rollers, said hopper having a discharge outlet adapted to discharge liquid plastic to between said feed rollers, a one of said feed rollers being in facing relationship vertically over a conveyor roller, said feed rollers rotating in opposite directions and being adapted to receive liquid plastic from said hopper and feed it onto said die plate while said one feed roller and said conveyor roller are adapted to grip said die plate therebetween and thereby convey said plate past said feed rollers.

8. Apparatus for die molding synthetic plastic materials to form sheet plastic articles such as doilies, tablecloths, and the like, comprising:
    (a) a flat faced die plate having a desired sheeting configuration cavity extending through one face thereof,
    (b) a washing apparatus for cleaning said die plate of all synthetic plastic material,
    (c) a feed apparatus comprising means for filling said cavity with a liquid plastic material, and means to wipe said one face of said die plate clean of any liquid plastic material whereby said cavity will be full only to the level of said one face,
    (d) means to cure said plastic material which is in said cavity.

9. The apparatus of claim 8, wherein said washing apparatus comprises a means for submerging said die plate within a liquid plastic solvent.

10. The apparatus of claim 9, wherein said washing apparatus is enclosed within an air-tight casing, said casing including an inlet and an outlet dooor for said die plate to pass through, said doors being self-closing.

11. The apparatus of claim 10, said outlet door opening into an air lock chamber, said chamber being enclosed by an air tight casing and comprising a second outlet door for said die plate to pass through, said second door also being self-closing.

12. The apparatus of claim 11, including a continuous conveyor means for carrying said die plate through said washing apparatus and then through said feed apparatus, and then through said curing means.

13. A coating machine for filling a die plate cavity with liquid plastic material, comprising, an inlet and outlet end, a conveyor means for horizontally carrying a die plate from said inlet to said outlet end, feed means proximate to said inlet end and comprising first and second parallel feed rollers arranged so as to provide a vertical space therebetween, said rollers rotating in opposite directions, said conveyor means comprising a conveyor roller which is vertically adjacent and parallel to said second feed roller, said second feed roller and said conveyor roller rotating in opposite directions and being adapted to grip a die plate therebetween and advance said die plate in a horizontal direction, said feed means comprising a hopper having a discharge end opening over and towards said feed rollers.

14. The coating machine of claim 13, wherein the lowest horizontal plane through which passes the outer circumferential surface of said first feed roller is upwardly spaced from the corresponding lowest horizontal plane through which passes the outer circumferential surface of said second feed roller.

15. The coating machine of claim 4, wherein the axis of rotation of said first feed roller lies in a horizontal plane upwardly spaced from the horizontal plane in which lies the axis of rotation of said second feed roller.

16. The coating machine of claim 13, wherein said feed rollers are horizontally adjustable so as to vary the width of the vertical space therebetween, said feed rollers also having vertically adjustable relative to said conveyor roller.

17. The coating machine of claim 13, said conveyor means comprising a plurality of conveyor rollers adapted to carry a die plate on their upper surfaces, wiper means comprising a doctor blade for each of said conveyor rollers, said blade being in wiping engagement with the rotating periphery of said conveyor roller, said wiper means also comprising wiper blades adapted to wipingly engage the upper surface of a die plate being carried on said conveyor rollers.

18. The coating machine of claim 17, wherein said wiper blades are vertically, longitudinally, and angularly adjustable relative to a horizontal plane.

19. The coating machine of claim 17, comprising a trough beneath said conveyor rollers, said trough being adapted to catch any material falling past said conveyor rollers.

20. The coating machine of claim 13, wherein said conveyor means comprises a plurality of spaced support rollers adapted to carry a die plate thereon, drive means operatively connected to said support rollers and rotating same at a drive speed, a fast wipe roller and drive means rotating said fast wipe roller at faster than said drive speed, the latter roller having a wiping surface adapted to wipe the bottom surface of a die plate which is carried by said support rollers.

21. The coating machine of claim 20, wherein said conveyor means further comprises an idler roller aligned vertically above said fast wipe roller, said idler and fast wiper rollers being adapted to contact opposite faces of a die plate while permitting it to pass therebetween.

22. The coating machine of claim 21, wherein said conveyor means comprises a disc roller means above each one of said support rollers and cooperating therewith so as to be adapted to pull a die plate therebetween.

23. The coating machine of claim 22, wherein each of said disc roller means comprises a pair of coaxial disc rollers and each of said support rollers comprises a cylindrical roller, each disc roller being located over one end of a cooperating support roller, whereby said disc rollers are adapted to contact only the side portions of the upper surface of a die plate which is being carried on said support rollers.

24. The coating machine of claim 21, wherein said idler roller comprises a pair of disc rollers while said fast wipe roller comprises a cylindrical roller, a one of said disc rollers being in cooperating relationship with each end of said cylindrical roller.

References Cited by the Examiner

UNITED STATES PATENTS

| | | | |
|---|---|---|---|
| 2,404,582 | 7/46 | Bosomworth | 18—15 |
| 2,439,305 | 4/48 | Johnson | 15—77 |
| 2,439,939 | 4/48 | Lesavoy | 18—15 X |
| 2,700,178 | 1/55 | Blake | 18—30 |
| 2,700,620 | 1/55 | Somers | 118—259 X |
| 2,732,584 | 1/56 | Bishop | 18—4 |
| 2,781,534 | 2/57 | Cochran et al. | 15—77 |
| 2,781,535 | 2/57 | Phillips et al. | 15—77 |
| 2,816,321 | 12/57 | Hutchroft et al. | 18—30 |
| 2,835,016 | 5/58 | Dixon | 25—2 |
| 2,914,784 | 12/59 | Floyd | 198—160 X |
| 2,958,095 | 11/60 | Ahlefeld et al. | 18—4 |
| 3,097,968 | 7/63 | Schaefer | 118—262 X |

J. SPENCER OVERHOLSER, *Primary Examiner.*

ROBERT F. WHITE, MICHAEL V. BRINDISI, WILLIAM J. STEPHENSON, *Examiners.*